US010439219B2

(12) United States Patent
Elam et al.

(10) Patent No.: US 10,439,219 B2
(45) Date of Patent: Oct. 8, 2019

(54) ULTRASTABLE CATHODES FOR LITHIUM SULFUR BATTERIES

(71) Applicant: UChicago Argonne, LLC, Chicago, IL (US)

(72) Inventors: Jeffrey W. Elam, Elmhurst, IL (US); Xiangbo Meng, Naperville, IL (US)

(73) Assignee: UChicago Argonne, LLC, Chicago, IL (US)

( * ) Notice: Subject to any disclaimer, the term of this patent is extended or adjusted under 35 U.S.C. 154(b) by 665 days.

(21) Appl. No.: 14/689,997

(22) Filed: Apr. 17, 2015

(65) Prior Publication Data
US 2016/0308209 A1    Oct. 20, 2016

(51) Int. Cl.
| H01M 4/58 | (2010.01) |
| H01M 4/62 | (2006.01) |
| H01M 10/052 | (2010.01) |
| H01M 4/66 | (2006.01) |
| H01M 4/1397 | (2010.01) |
| H01M 4/04 | (2006.01) |
| H01M 4/38 | (2006.01) |
| H01M 4/587 | (2010.01) |
| H01M 4/13 | (2010.01) |

(52) U.S. Cl.
CPC .......... *H01M 4/5815* (2013.01); *H01M 4/13* (2013.01); *H01M 4/38* (2013.01); *H01M 4/587* (2013.01); *H01M 4/622* (2013.01); *H01M 4/625* (2013.01); *H01M 4/661* (2013.01); *H01M 4/0404* (2013.01); *H01M 4/0471* (2013.01); *H01M 10/052* (2013.01)

(58) Field of Classification Search
None
See application file for complete search history.

(56) References Cited

U.S. PATENT DOCUMENTS

| 5,814,420 | A | * | 9/1998 | Chu | C07C 227/32 |
| | | | | | 136/238 |
| 8,828,575 | B2 | | 9/2014 | Visco et al. | |
| 2006/0234126 | A1 | * | 10/2006 | Kolosnitsyn | H01M 4/0404 |
| | | | | | 429/231.95 |
| 2012/0135318 | A1 | | 5/2012 | Kim et al. | |
| 2013/0059209 | A1 | * | 3/2013 | Ota | H01M 4/131 |
| | | | | | 429/304 |
| 2014/0127575 | A1 | * | 5/2014 | Scrosati | H01M 4/366 |
| | | | | | 429/213 |

(Continued)

FOREIGN PATENT DOCUMENTS

| WO | WO 2013/141195 | * | 9/2013 | .......... H01M 10/052 |
| WO | WO 2014/082296 | * | 6/2014 | .............. H01M 4/13 |

OTHER PUBLICATIONS

Federal Register, vol. 76, No. 27 issued Feb. 9, 2011 which details Supplementary Examination Guidelines for Determining Compliance with 35 U.S.C. 112 and for Treatment of Related Issues in Patent Applications, pp. 7162-7175.*

(Continued)

*Primary Examiner* — Amanda J Barrow
(74) *Attorney, Agent, or Firm* — Foley & Lardner LLP

(57) ABSTRACT

A cathode for a lithium-sulfur battery includes a copper-containing current collector, over which an active material layer is disposed. A method of producing the cathode is provided. A lithium-sulfur battery including the cathode provides improved capacity and cycleability.

10 Claims, 32 Drawing Sheets

(56) References Cited

U.S. PATENT DOCUMENTS

| | | | |
|---|---|---|---|
| 2014/0178791 A1* | 6/2014 | Vallance | H01M 4/582 |
| | | | 429/482 |
| 2014/0255795 A1* | 9/2014 | Manthiram | H01M 4/366 |
| | | | 429/337 |
| 2014/0272564 A1* | 9/2014 | Holme | H01M 4/364 |
| | | | 429/211 |
| 2015/0072248 A1* | 3/2015 | Watanabe | H01M 4/38 |
| | | | 429/336 |
| 2016/0226104 A1* | 8/2016 | Teran | H01M 10/0569 |

OTHER PUBLICATIONS

Stankovich et al., "Synthesis of graphene-based nanosheets via chemical reduction of exfoliated graphite oxide," Carbon, vol. 45, Issue 7, Jun. 2007, pp. 1558-1565.*

Park et al., "One-step synethsis of sulfur-impregnated graphene cathode for lithium sulfur batteries," Phys. Chem. Chem. Phys., 2012, 14, 6796-6804 (Year: 2012).*

Liu et al., "High Coulombic efficiency cathode with nitryl grafted sulfur for Li—S battery," Energy Storage Materials, 2018, https://doi.org/10.1016/j.ensm.2018.07.009 (Year: 2018).*

\* cited by examiner

ULTRASTABLE CATHODES FOR LITHIUM SULFUR BATTERIES

STATEMENT REGARDING FEDERALLY SPONSORED RESEARCH

This invention was made with government support under Contract No. DE-AC02-06CH11357 awarded by the U.S. Department of Energy, Office of Science, Office of Basic Energy. The United States government has certain rights in this invention.

BACKGROUND

The finite reserves and combustion emissions of fossil fuels (i.e., petroleum, natural gas, and coal) as primary energy supplies pose severe challenges to future energy security. Renewable clean energy sources, such as solar and wind energy, are relatively cheap and abundant, and thus have been sought to address the shortcomings of fossil fuels. However, due to the intermittent operation and geographical limitations of renewable clean energy sources, there is a need for electrical energy storage (EES) devices to enable their wide implementation and implementation in portable forms. Batteries are well developed and successful EES devices. Lithium-ion batteries (LIBs) are commonly employed in consumer electronics, at least in part due to their high energy density. However, even state-of-the-art LIBs are not practical as a power source for transportation vehicles in the place of gasoline, as they exhibit a practical ~150 Wh/kg in comparison to an at-least 300 Wh/kg desired for electric vehicles (EVs).

In addition to the development of next-generation LIBs, EES concepts beyond LIBs have been investigated. Lithium-sulfur (Li—S) batteries are among the most attractive EES options due to a theoretical energy density of 2500 Wh/kg. In addition, sulfur is abundant and cheap. However, pre-existing Li—S batteries suffer from many technical issues which prevent effective commercialization. Such technical issues include: (1) safety risks associated with the use of lithium metal as an anode, (2) the full utilization of sulfur-related active materials due to the insulating nature of sulfur and polysulfide species, and (3) the severe reduction of battery cycleability as a result of the shuttling of the active materials to the lithium metal anode due to the solubility of polysulfide species. Various strategies have been employed in an attempt to resolve these issues, and thereby make Li—S batteries a commercially viable technology. Among the employed strategies, $Li_2S$ was proposed as a replacement for S in order to avoid using lithium metal as anodes, and carbon-supported nanostructures were designed to improve the conductivities of S or $Li_2S$. Attempts have also been made to depress the shuttling of S active materials to maintain the S active materials on the cathode to improve the cycleability of Li—S batteries, including employing porous and encapsulating matrices, various immobilizers (such as highly reactive functional groups and Cu nanoparticles), electrolyte additives ($LiNO_3$), solid state electrolytes, aqueous/electrolyte dissolved polysulfide cathode, separator modification or new separator materials, new liquid electrolytes, aqueous binders, and surface coatings, among others. However, despite these efforts practical Li—S batteries employing microsized commercial $Li_2S$ or S were not produced.

SUMMARY OF THE INVENTION

A cathode is provided. The cathode includes a current collector and an active material layer disposed over the current collector. The active material includes a sulfur-containing material, and the current collector includes copper.

A lithium-sulfur battery is provided. The Li—S battery includes a cathode, an anode, and a lithium ion conducting electrolyte. The cathode includes a current collector including copper and an active material layer including an active material. The active material layer is disposed over the current collector, and the active material comprises a sulfur-containing material.

A method of producing a cathode is provided. The method includes forming a slurry containing an active material and a solvent, and disposing the slurry over a current collector. The active material includes a sulfur-containing material, and the current collector includes copper.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Following below are more detailed descriptions of various concepts related to, and embodiments of, inventive cathodes for lithium-sulfur (Li—S) batteries containing copper current collectors. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

The present inventors have discovered that employing copper-containing current collectors in Li—S battery cathodes improves the cycling stability and capacity sustainability of the batteries over multiple charge-discharge cycles. The improvements associated with the copper-containing current collectors allow the use of commercially available lithium sulfide ($Li_2S$) or sulfur (S) to produce practical Li—S batteries at low cost.

Figure 1:
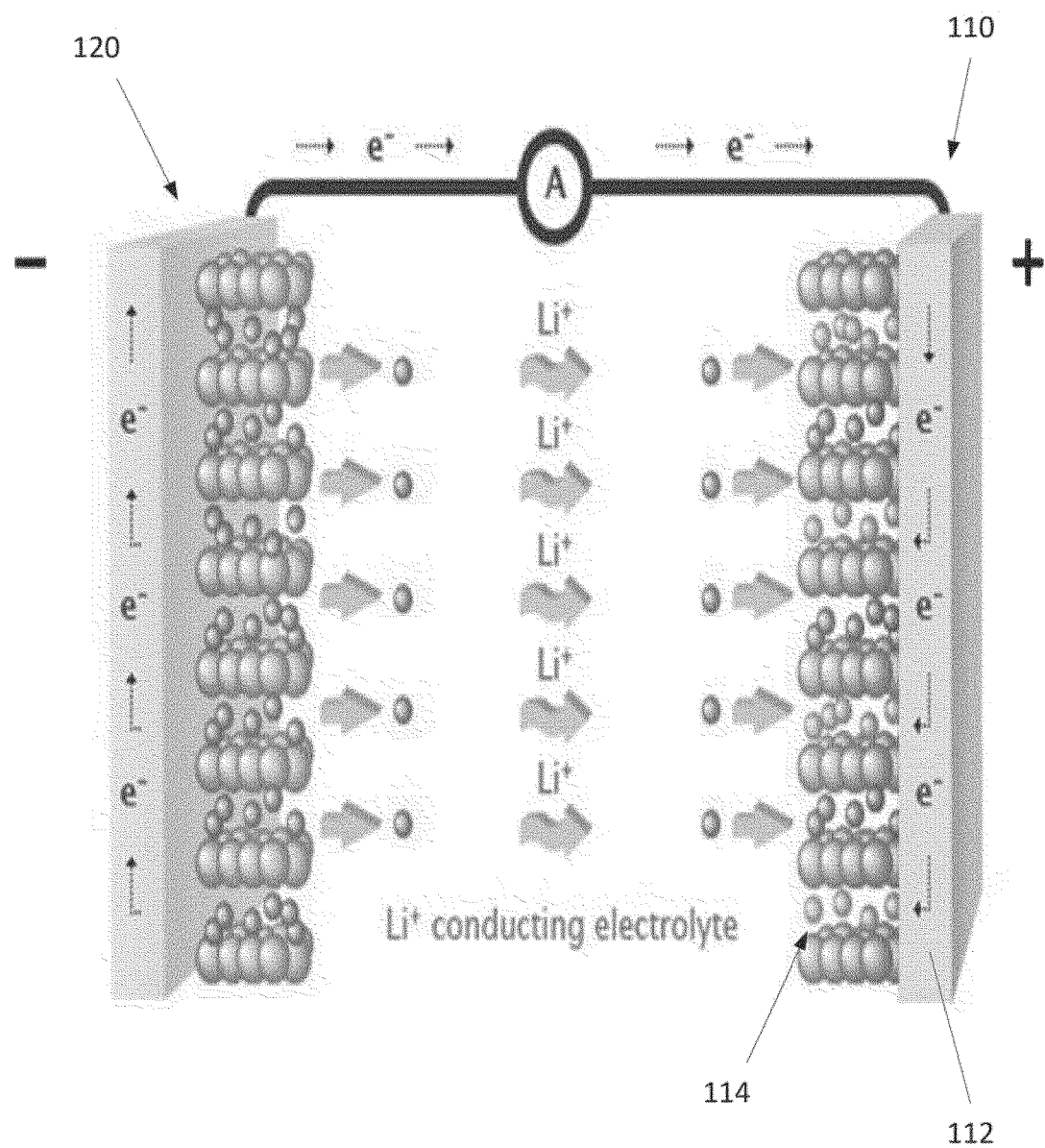
FIG. 1 depicts a schematic representation of a Li—S battery including a cathode having a copper current collector.

FIG. 1 depicts a schematic representation of a Li—S battery. The battery includes a cathode 110, an anode 120, and a lithium ion conducting electrolyte. The cathode 110 includes an active material layer 114 disposed over a current collector 112.

The cathode includes a copper-containing current collector and an active material layer disposed over the current collector. The active material layer includes an active material that includes sulfur-containing material, and the active material layer may optionally include a binder and/or conductive material.

The copper-containing current collector may be any suitable material that includes copper. The current collector may be a copper (Cu) foil. Alternatively, the current collector may be a copper alloy.

The active material contained in the active material layer may include $Li_2S$ or S. The active material may be a powder, such as a microsized powder. As utilized herein, microsized may refer to a particle with a diameter of less than 1,000 microns. The $Li_2S$ component of the active material may be a commercially available microsized $Li_2S$ powder. The active material may include a graphene material and/or copper containing material, such as copper sulfide ($Cu_2S$), as an additional component. The graphene component may be in the form of graphene nanosheets, such as reduced graphene oxide nanosheets (rGNS) or nitrogen-doped graphene nanosheets (NGNS).

The active material may include any suitable amount of $Li_2S$ or S. The $Li_2S$ or S may account for the entirety of the active material. Alternatively, the $Li_2S$ or S may account for at least about 50% of the active material by weight, with the balance of the active material being one of the additional components. The ratio of the $Li_2S$ or S to the additional component of the active material may be in the range of about 1:1 to about 5:2, such as about 2:1.

The active material layer may include the active material in any suitable amount. The active material may be present in the active material layer in an amount of about 30% to about 85% by weight, such as about 35% to about 80%. The balance of the active material layer may be composed of a binder and/or a conductive material. The active material layer may include the conductive material and the binder in a ratio of about 1:1 to about 2:1.

The binder may be any suitable binder material. The binder serves to bind the particles of the active material to each other, and to the current collector. The binder may be a polymer material, such as polyvinylidene fluoride (PVDF) and/or polyethylene oxide (PEO).

The conductive material may be any suitable electrically conductive material. The conductive material may be a carbon-based material, such as carbon black. The carbon black may be a commercially available carbon black material.

The cathode is formed by disposing a slurry containing the components of the active material layer over the current collector. The slurry may be disposed over the current collector utilizing any appropriate method. The slurry may be cast over the current collector utilizing a doctor blade, such that a slurry layer with a thickness of about 25 microns to about 200 microns is produced. The thickness of the slurry layer may be tuned to any appropriate thickness.

The slurry may be formed by any appropriate method. The slurry may be formed by mixing the active material and any additional components with a solvent. The solvent may be any appropriate solvent, such as N-methyl-2-pyrrolidone (NMP). The slurry components may be mixed by any appropriate process, such as ball milling, and may continue until a homogeneous slurry is produced.

The current collector that is coated with the slurry layer may be subjected to a curing treatment. The curing treatment may include placing the coated current collector in a furnace, such that the solvent is removed and the slurry is dried. The furnace may be at any appropriate temperature to remove the solvent, such as about 80° C. The curing treatment may take place in an inert atmosphere, such as an argon atmosphere. The length of the curing process may be sufficient to remove the solvent from the slurry, such as about 8 hours or up to about 24 hours.

The anode of the Li—S battery employed in conjunction with the cathode may be formed from any appropriate material. The anode may include lithium metal. Alternatively, the inclusion of $Li_2S$ in the cathode may allow the anode to be formed from a material other than metallic lithium, such as tin or silicon. Eliminating metallic lithium electrodes from the Li—S battery decreases the chances of catastrophic failure, thereby increasing the safety of the Li—S battery.

The electrolyte of the Li—S battery may be any suitable electrolyte. The electrolyte may include a solvent and a lithium salt. The lithium salt may be any suitable lithium salt, such as lithium bis(trifluoromethanesulfonyl)imide (LITFSI). The solvent may be a mixture of solvents, such as a 1:1 mixture of 1,3-dioxolane (DOL) and 1,2-dimethoxyethane (DME).

The Li—S battery including the copper cathode current collector may provide a stable charge-discharge cycling behavior and a high sustainable capacity. The battery may have a sustainable capacity at least 400 mAh/g over 100 cycles, such as at least about 600 mAh/g over 300 cycles. The battery may have a sustainable capacity of at least about 800 mAh/g over 300 cycles. The battery may have a Coulombic efficiency of at least about 95% over 100 cycles, such as about 100% over 300 cycles. The Li—S may have an energy density of at least about 1200 Wh/Kg, such as at least about 1440 Wh/Kg. The cycleability and energy density of the battery may be especially suitable for use in transportation applications, such as electric vehicles.

The Li—S battery including the copper cathode current collector may exhibit ultrastable cycling capabilities. Ultrastable cycling may include substantially no capacity drops after 400 cycles for more than 6 months with 100% Coulombic efficiency. The beneficial effect of the copper-containing current collector may be due in part to improved conductivity of the cathodes due to copper diffusion, maintaining active sulfur species on the cathode side by inhibiting sulfur shuttle effects. The active sulfur species may include S, $Li_2S$, and $Li_xS$, where x is an integer between 2 and 8. Additionally, the charge-discharge plateaus may be separated by about 0.1 V.

NON-LIMITING EXEMPLARY EMBODIMENTS

A variety of cathodes were produced. The cathodes were then assembled in to coin cells in an argon environment with $H_2O$ and $O_2$ levels of less than 1 ppm. Lithium metal was employed as the reference electrode, a Celgard 2325 membrane was used as a separator, and 1 M lithium bis(trifluoromethanesulfonyl)imide (LITFSI) in 1,3-dioxolane (DOL) and 1,2-dimethoxyethane (DME) (DOL:DME=1:1 by volume) was used as the electrolyte. Discharge-charge testing was performed on an Arbin 2043 battery tester using a voltage window of 1.6-3.0 V or 1.0-3.0 V and a current density of 100 mA/g. The electrochemical tests were conducted at room temperature.

Example 1

A cathode was prepared having an active material loading of 70% on a copper foil current collector. The cathode was fabricated by ball-milling a mixture of 70% active material, 20% Super P carbon black, and 10% polyvinylidene (PVDF) with N-methyl-2-pyrrolidone (NMP) as a solvent for 1 hour to form a homogeneous slurry. The slurry was cast on to the copper foil current collector using a doctor blade, and the resulting laminate was dried in a furnace at 80° C. within an Ar-filled glove box for 24 hours. The laminate was then punched to form 7/16 inch circular cathodes.

Figure 2:
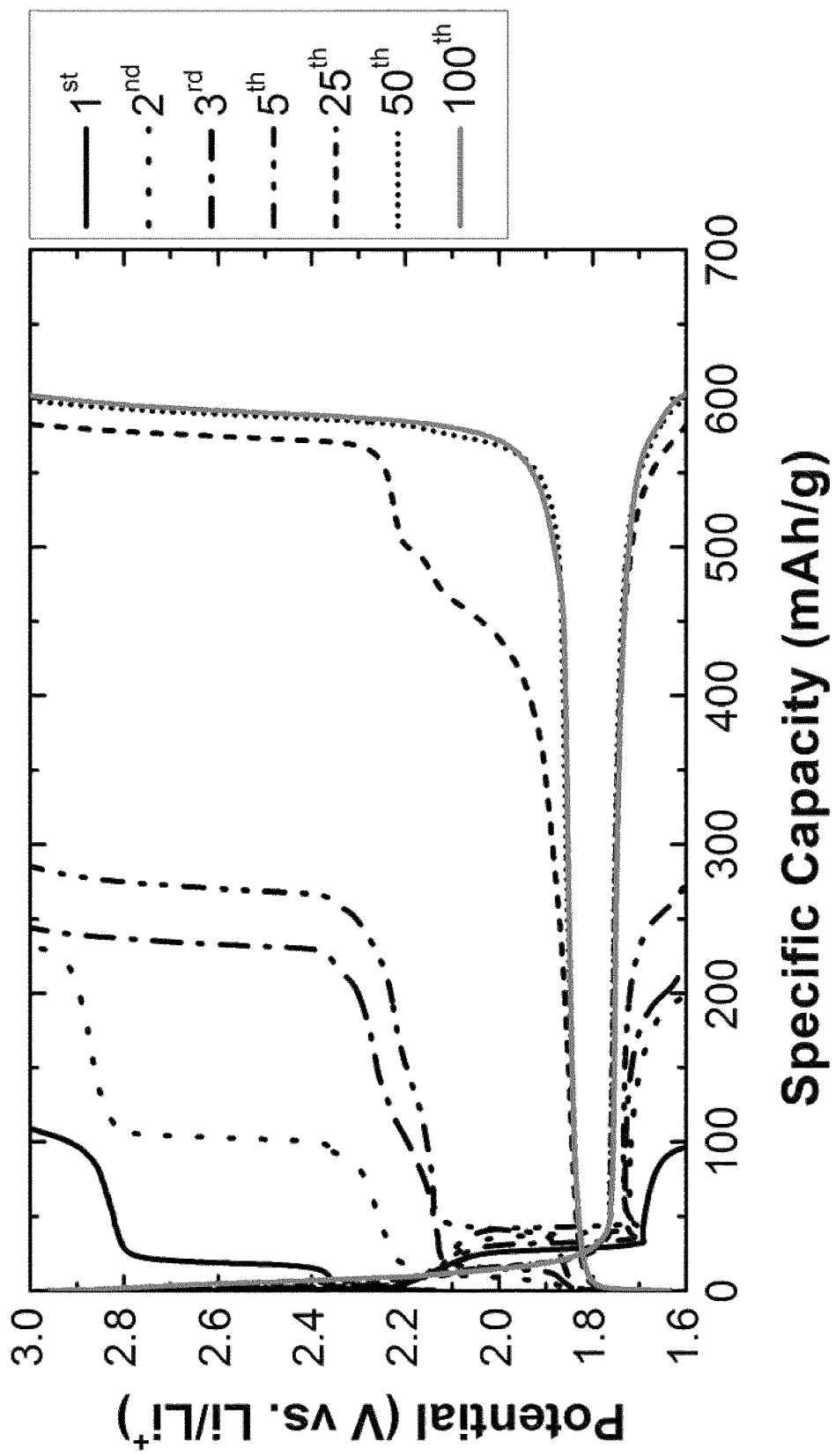
FIG. 2 depicts the charge-discharge profiles of a cathode having a loading of 70% by weight of an active material on a Cu current collector under a current density of 100 mA/g and a voltage window of 1.6-3.0 V, where the active material is $Li_2S$.
Figure 3:
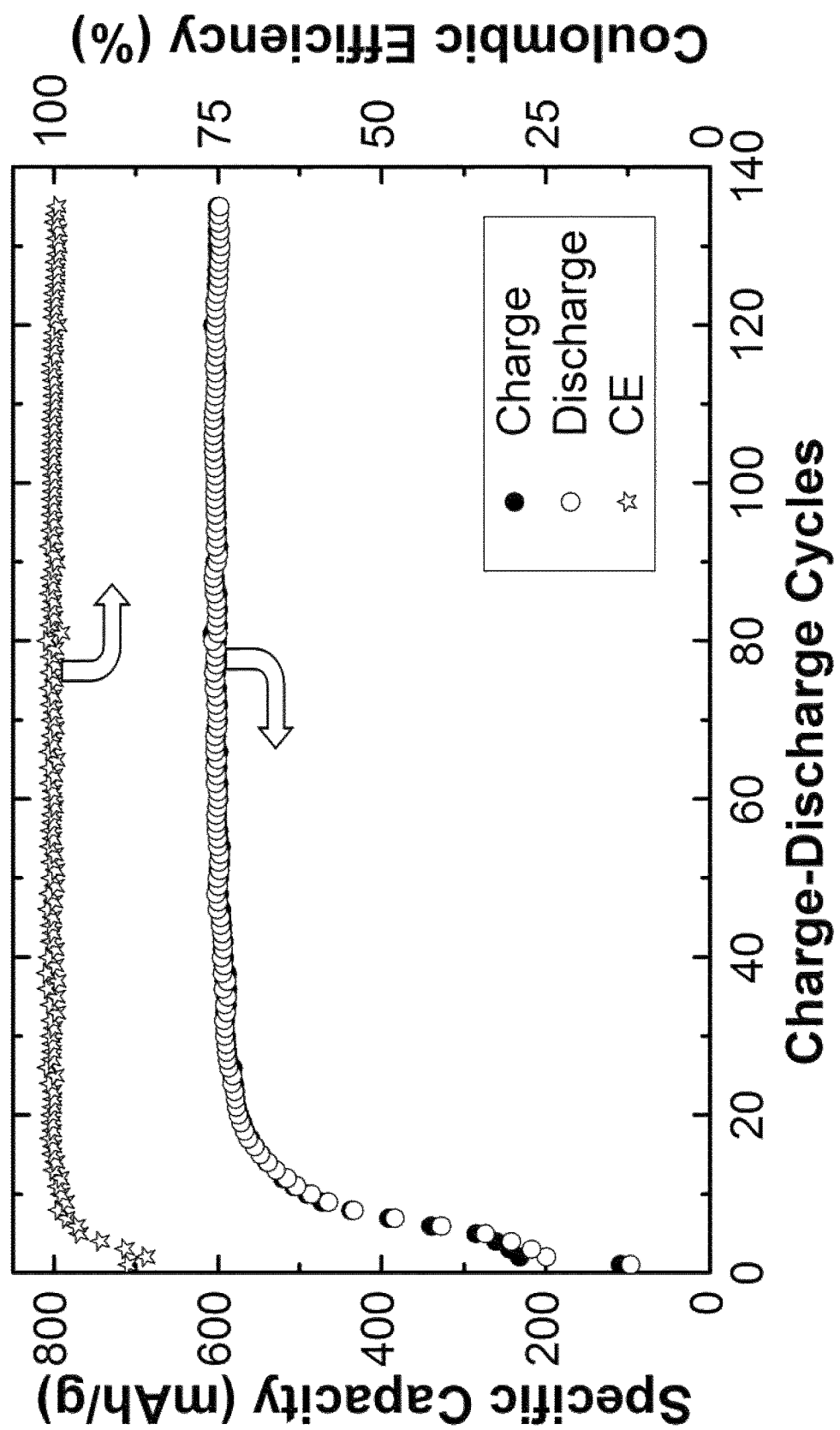
FIG. 3 depicts the cycling performance and Coulombic efficiency of the cathode of FIG. 2.
Figure 4:
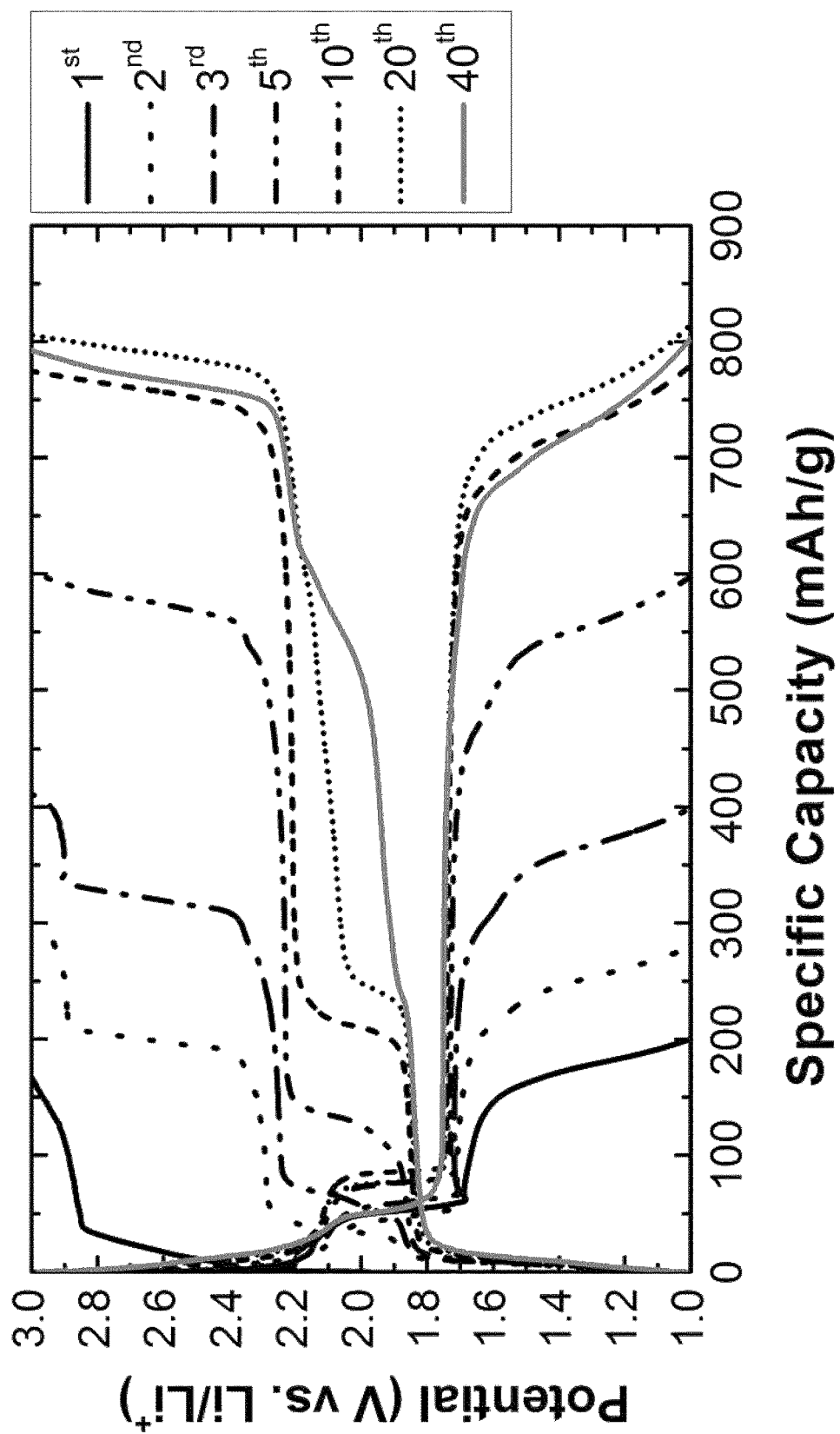
FIG. 4 depicts the charge-discharge profiles of a cathode having a loading of 70% by weight of an active material on a Cu current collector under a current density of 100 mA/g and a voltage window of 1.0-3.0 V, where the active material is $Li_2S$.
Figure 5:
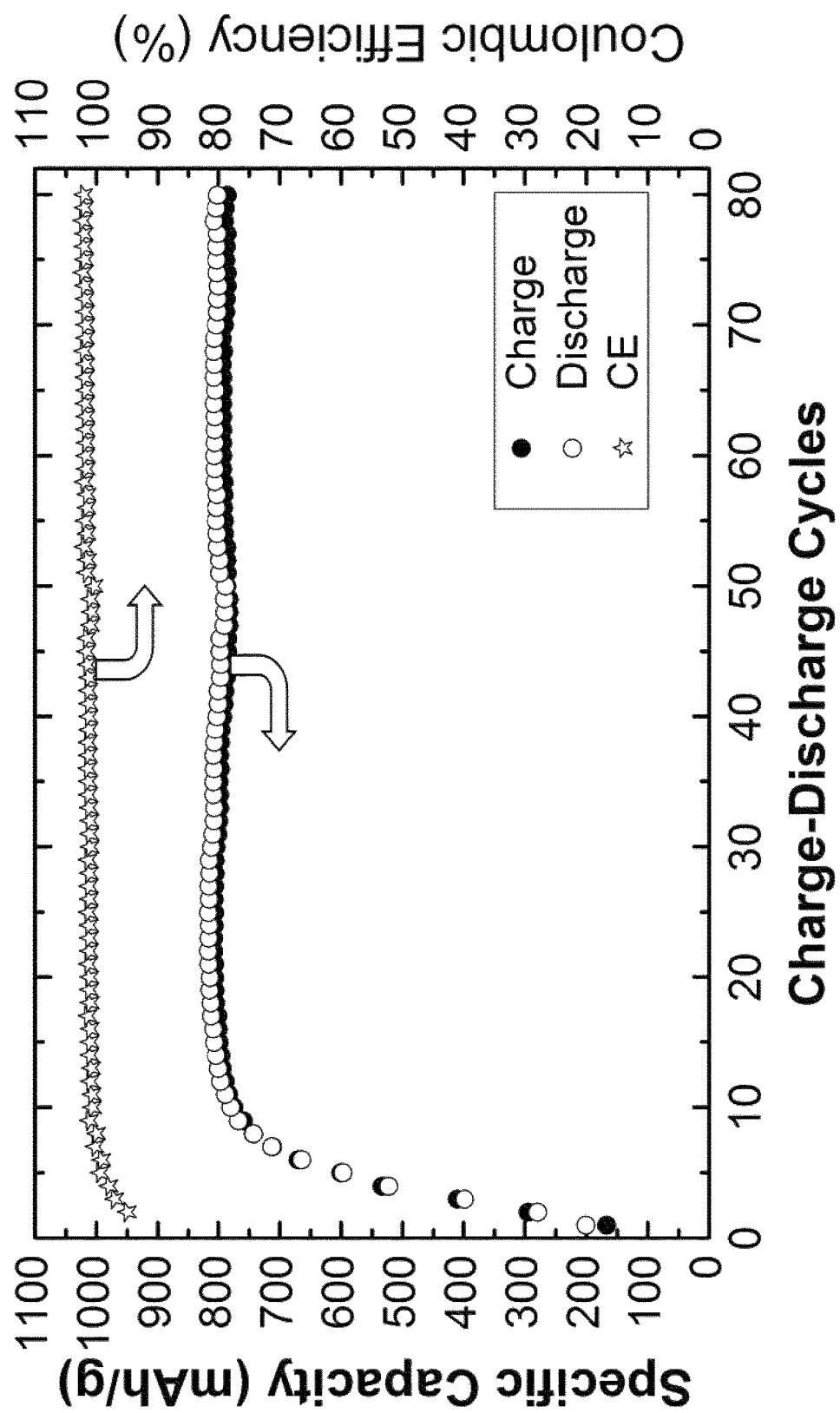
FIG. 5 depicts the cycling performance and Coulombic efficiency of the cathode of FIG. 4.

The active material was microsized $Li_2S$. As shown in FIGS. 2 and 3, the cathode produced a sustainable capacity of 500-600 mAh/g in over 100 cycles, a Coulombic efficiency of 100% and a fade rate of 0.00% using a voltage window of 1.6-3.0 V. A continuous increase in capacity was observed over the first 20 cycles, which may have been a result of the coating of the cured PVDF binder on the $Li_2S$ particles. As shown in FIGS. 4 and 5, the cathode exhibited higher capacity when a voltage window of 1.0-3.0 V was used.

Example 2

Figure 6:
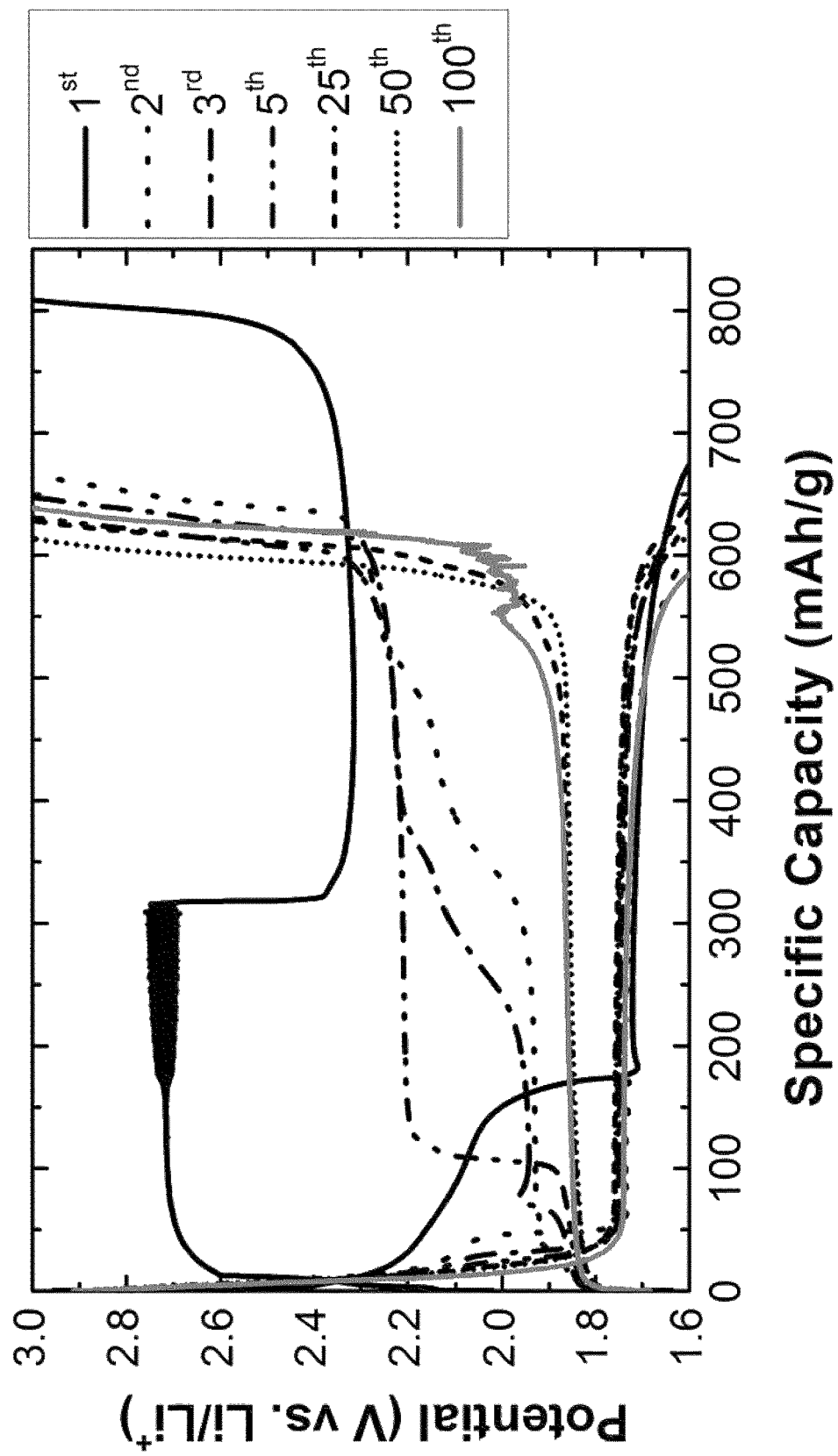
FIG. 6 depicts the charge-discharge profiles of a cathode having a loading of 70% by weight of an active material on a Cu current collector under a current density of 100 mA/g and a voltage window of 1.6-3.0 V, where the active material is $Li_2S$ and the cathode is not cured.
Figure 7:
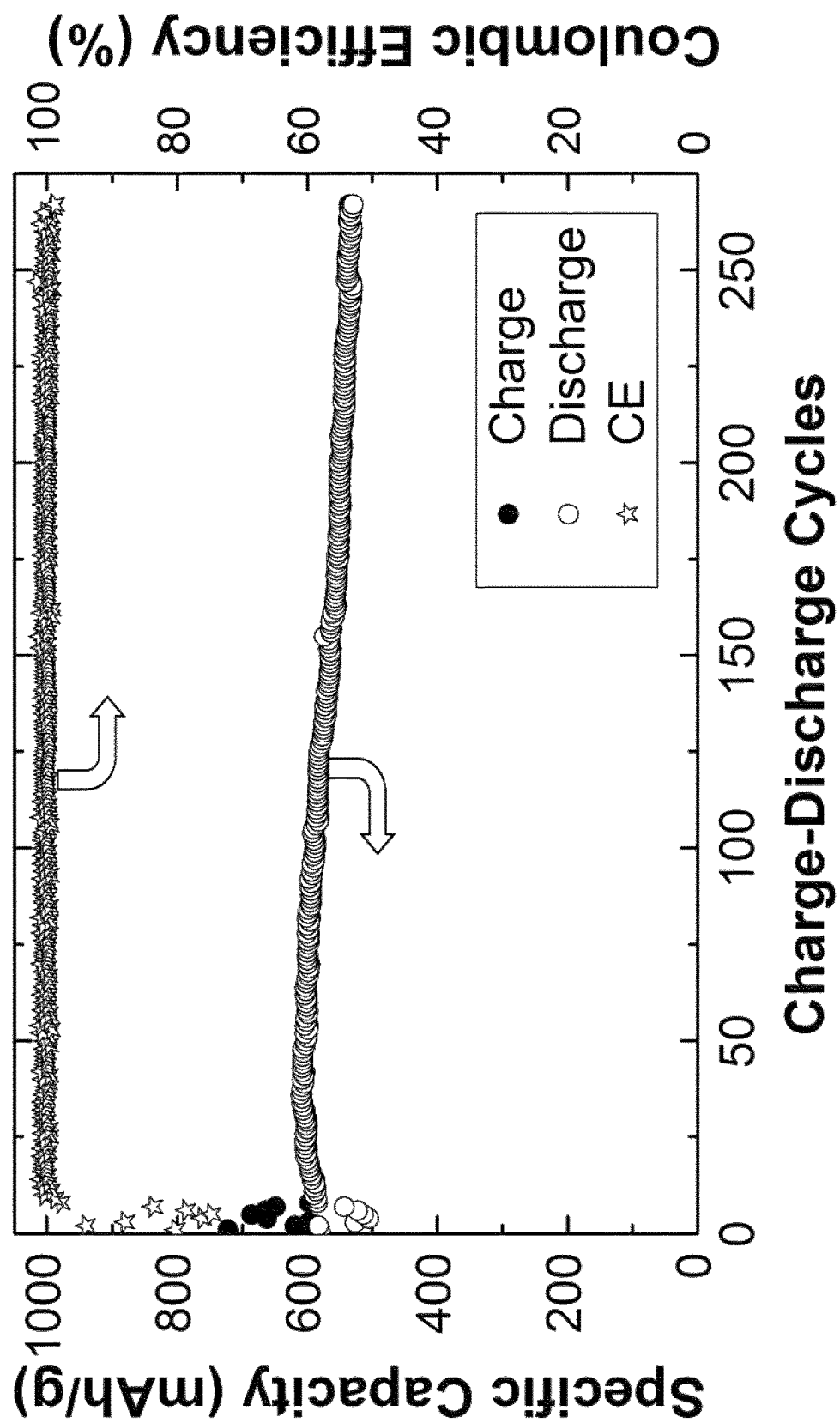
FIG. 7 depicts the cycling performance and Coulombic efficiency of the cathode of FIG. 6.

A cathode was prepared according to the method of Example 1, except the laminate was not dried in the furnace at 80° C. such that the PVDF was not cured. The results shown in FIGS. 6 and 7 for the uncured cathode verify that the continuous increase in capacity observed over the first 20 cycles for Example 1 was attributable to the coating of the cured PVDF on the $Li_2S$ particles.

Comparative Example 1

Figure 8:
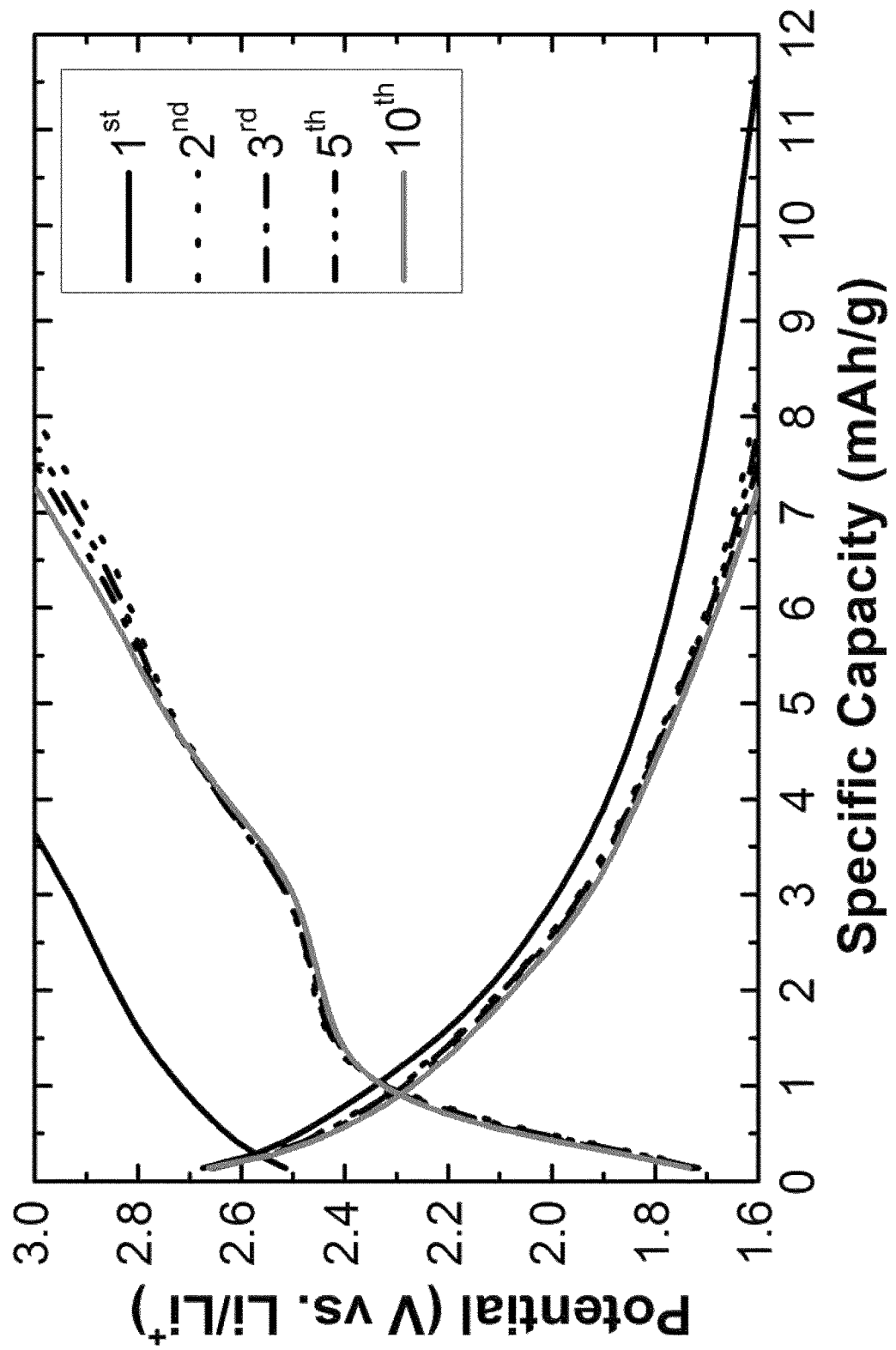
FIG. 8 depicts the charge-discharge profiles of a cathode having a loading of 70% by weight of an active material on an Al current collector under a current density of 100 mA/g and a voltage window of 1.6-3.0 V, where the active material is $Li_2S$.
Figure 9:
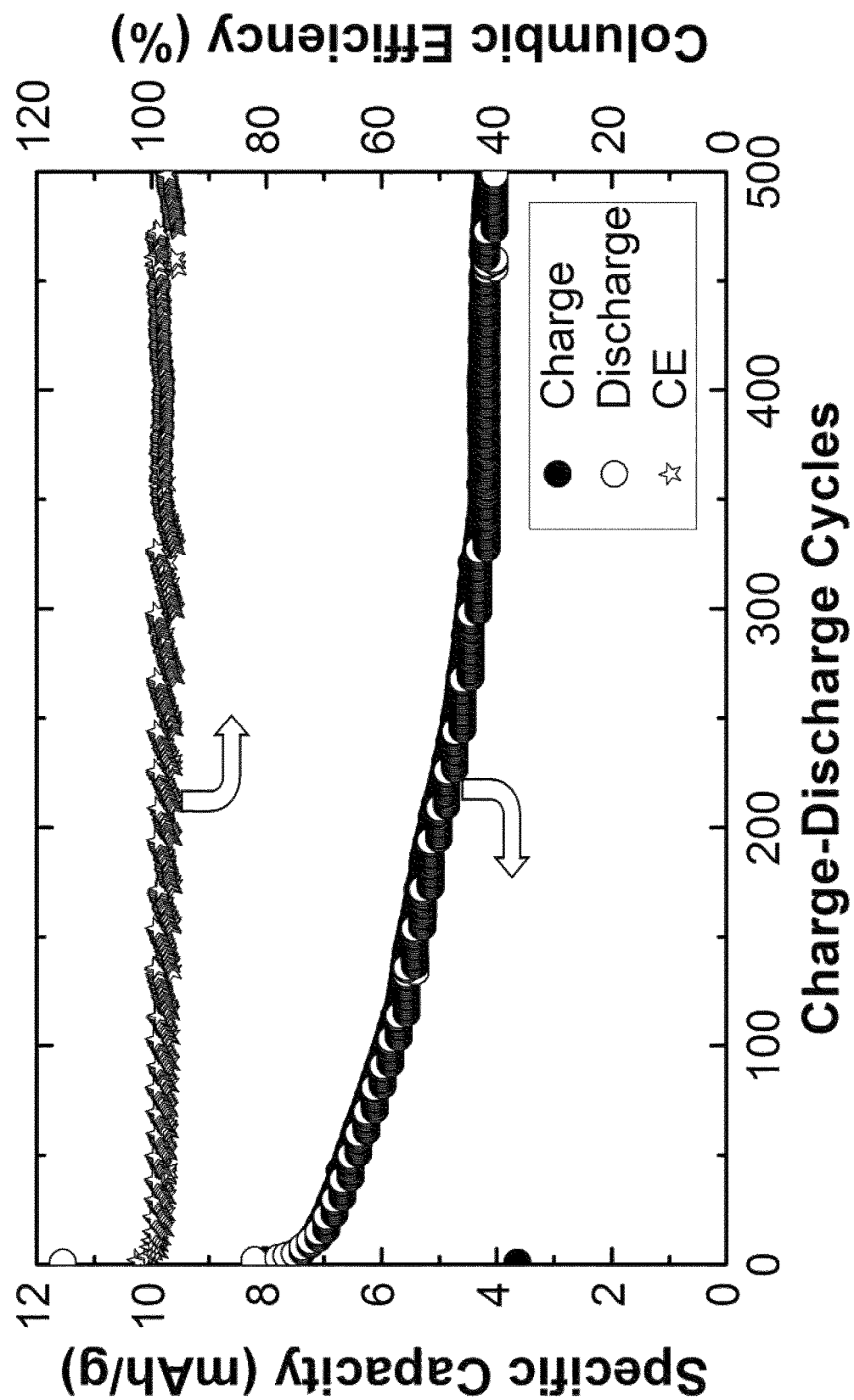
FIG. 9 depicts the cycling performance and Coulombic efficiency of the cathode of FIG. 8.

A cathode was prepared according to the method of Example 1, except that the current collector was an aluminum foil. As shown in FIGS. 8 and 9, the capacities of the cathodes are low, at about 10 mAh/g.

Example 3

Figure 10:
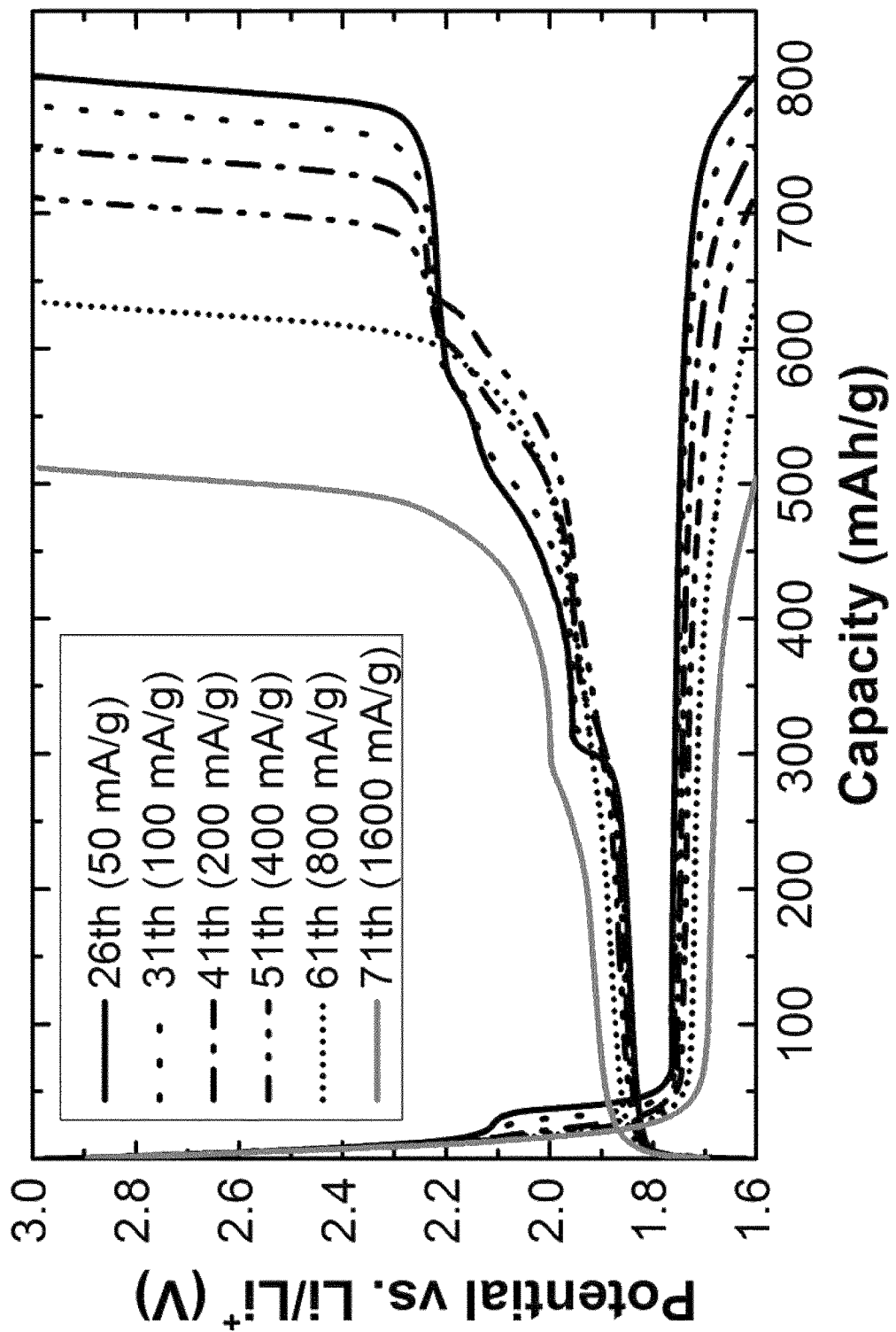
FIG. 10 depicts the charge-discharge profiles of a cathode having a loading of 70% by weight of an active material on a Cu current collector under current densities of 50 mA/g, 100 mA/g, 200 mA/g, 400 mA/g, 800 mA/g, 1600 mA/g and 3200 mA/g and a voltage window of 1.6-3.0 V, where the active material is $Li_2S$.
Figure 11:
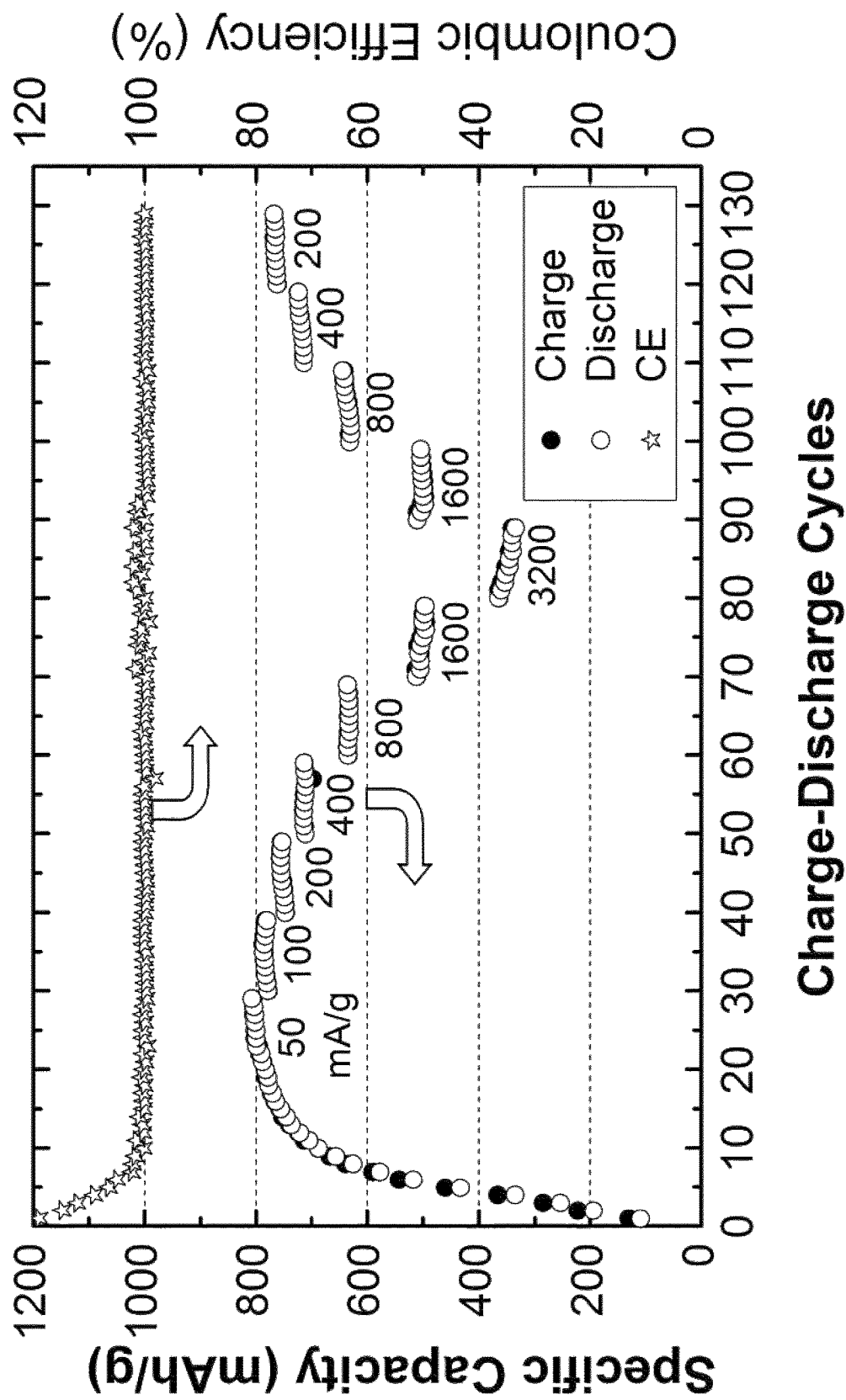
FIG. 11 depicts the rate capability and Coulombic efficiency of the cathode of FIG. 10.
Figure 12:
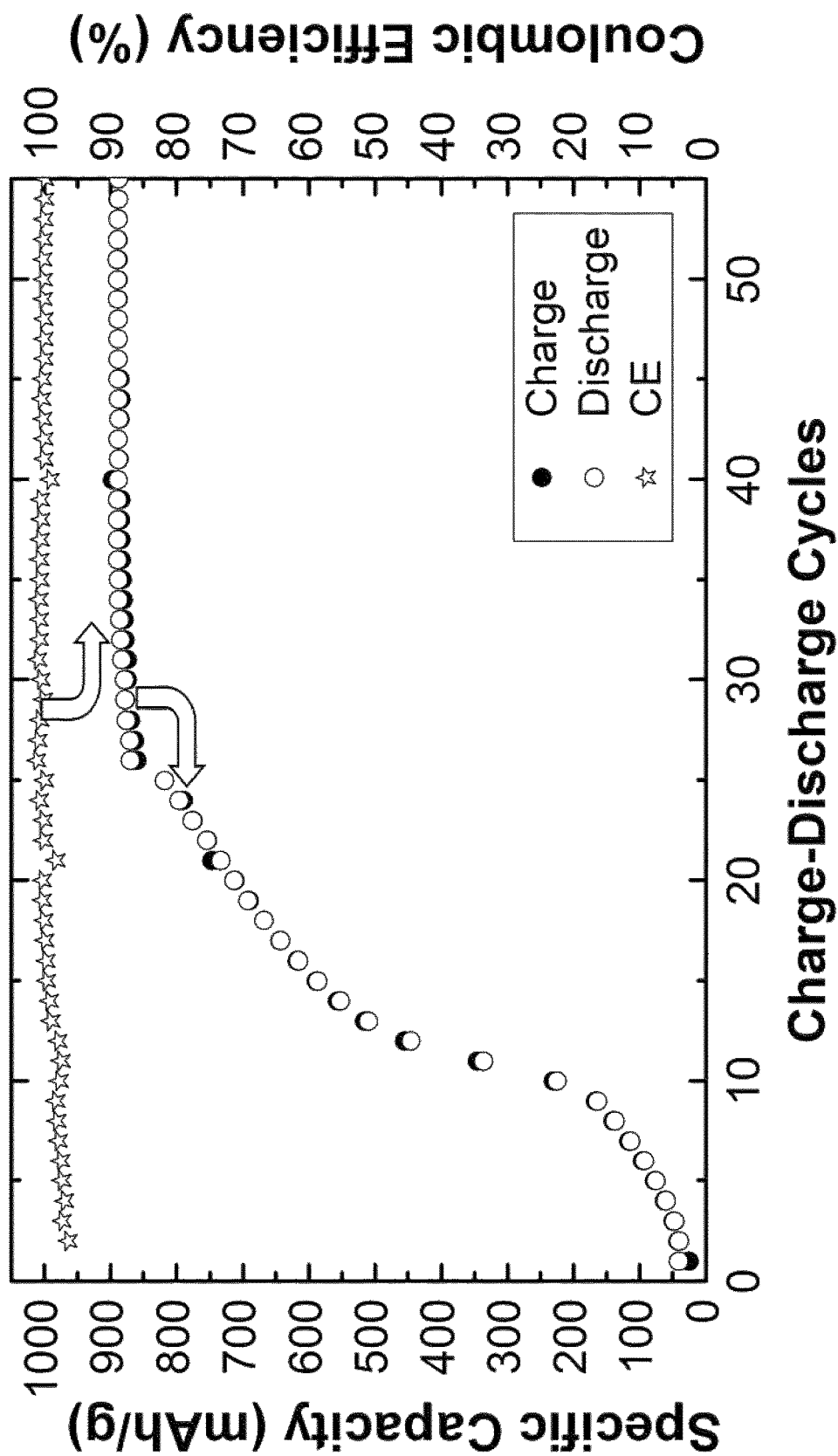
FIG. 12 depicts the cycling performance and Coulombic efficiency of a cathode having a loading of 80% by weight of an active material on a Cu current collector under a current density of 100 mA/g and a voltage window of 1.6-3.0 V, where the active material is $Li_2S$.

The cathode of Example 1 was tested over a voltage window of 1.6-3.0 V under current densities of 50 mA/g, 100 mA/g, 200 mA/g, 400 mA/g, 800 mA/g, 1600 mA/g and 3200 mA/g. As shown in FIGS. 10 and 11, sustainable capacities of 800 mAh/g, 785 mAh/g, 755 mAh/g, 633 mAh/g, 504 mAh/g, and 340 mAh/g were produced, respectively, along with Coulombic efficiencies of 100% for each current density.

Example 4

A cathode was prepared according to the method of Example 1, except that the ball-milled mixture included 80% active material, 10% Super P carbon black, and 10% PVDF with NMP as a solvent. As shown in FIG. 38, after about 20 cycles a Coulombic efficiency of about 100% and a specific capacity of greater than 800 mAh/g were achieved.

Example 5

Figure 13:
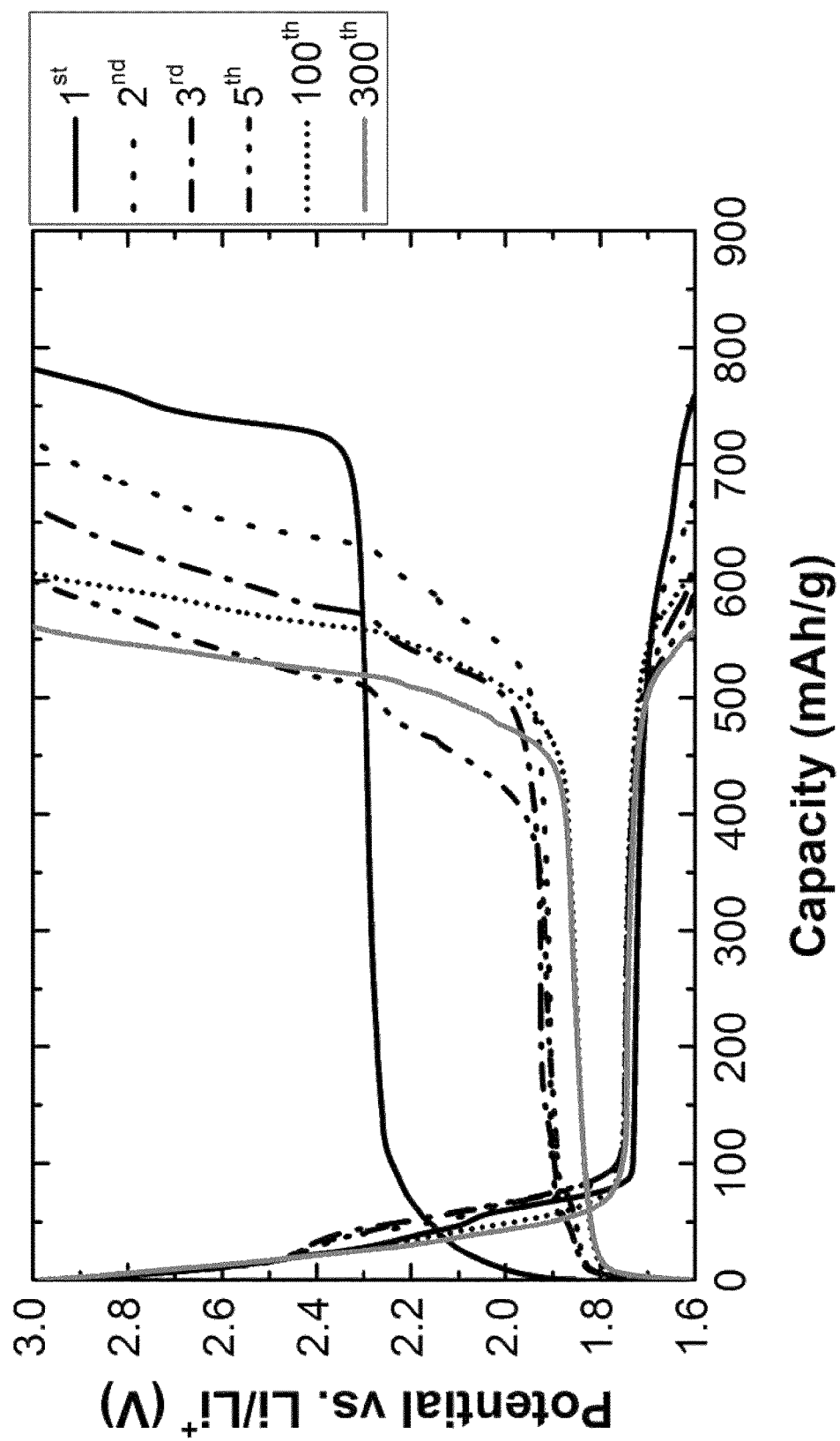
FIG. 13 depicts the charge-discharge profiles of a cathode having a loading of 70% by weight of an active material on a Cu current collector under a current density of 100 mA/g and a voltage window of 1.6-3.0 V, where the active material is a 1:1 mixture of $Li_2S$ and nitrogen-doped graphene nanosheets (NGNS).

A cathode was prepared according to the method of Example 1, except that the active material was a 1:1 mixture of $Li_2S$ and NGNS. As shown in FIG. 13, the first charge exhibited a flat plateau between 2.2 V and 2.3 V, followed by a sharp rise to 3.0 V. The first discharge exhibited a short plateau at 2.4 V, a drop to a long flat plateau at 1.73 V, and then a slope to 1.6 V. The second charge profile showed a long flat plateau at potentials between 1.8 V and 1.93 V, and then a quick increase to 3.0 V. The second discharge profile was similar to the first discharge profile, although a slight capacity drop was observed. Subsequent charge profiles are similar to the second charge profile, and the plateaus stabilized at 1.8-1.9 V.

Figure 14:
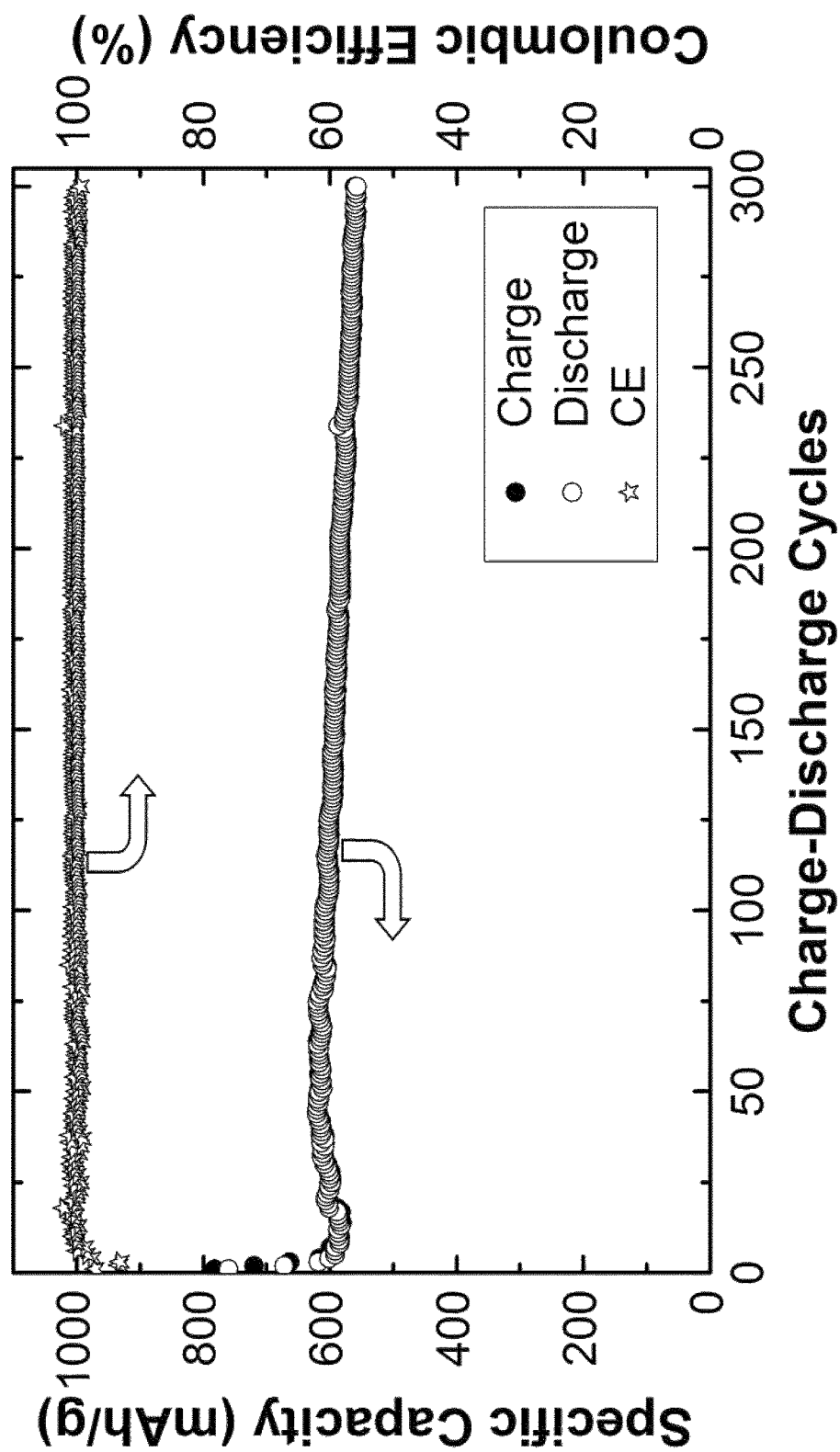
FIG. 14 depicts the cycling performance and Coulombic efficiency of the cathode of FIG. 13.

As shown in FIG. 14, super stable cycleability was realized in 300 cycles. The first three cycles produced capacity fade of 120 mAh/g, but the remaining 300 cycles produced a capacity drop of 100 mAh/g, corresponding to a fade rate of 0.05% per cycle.

Comparative Example 2

Figure 15:
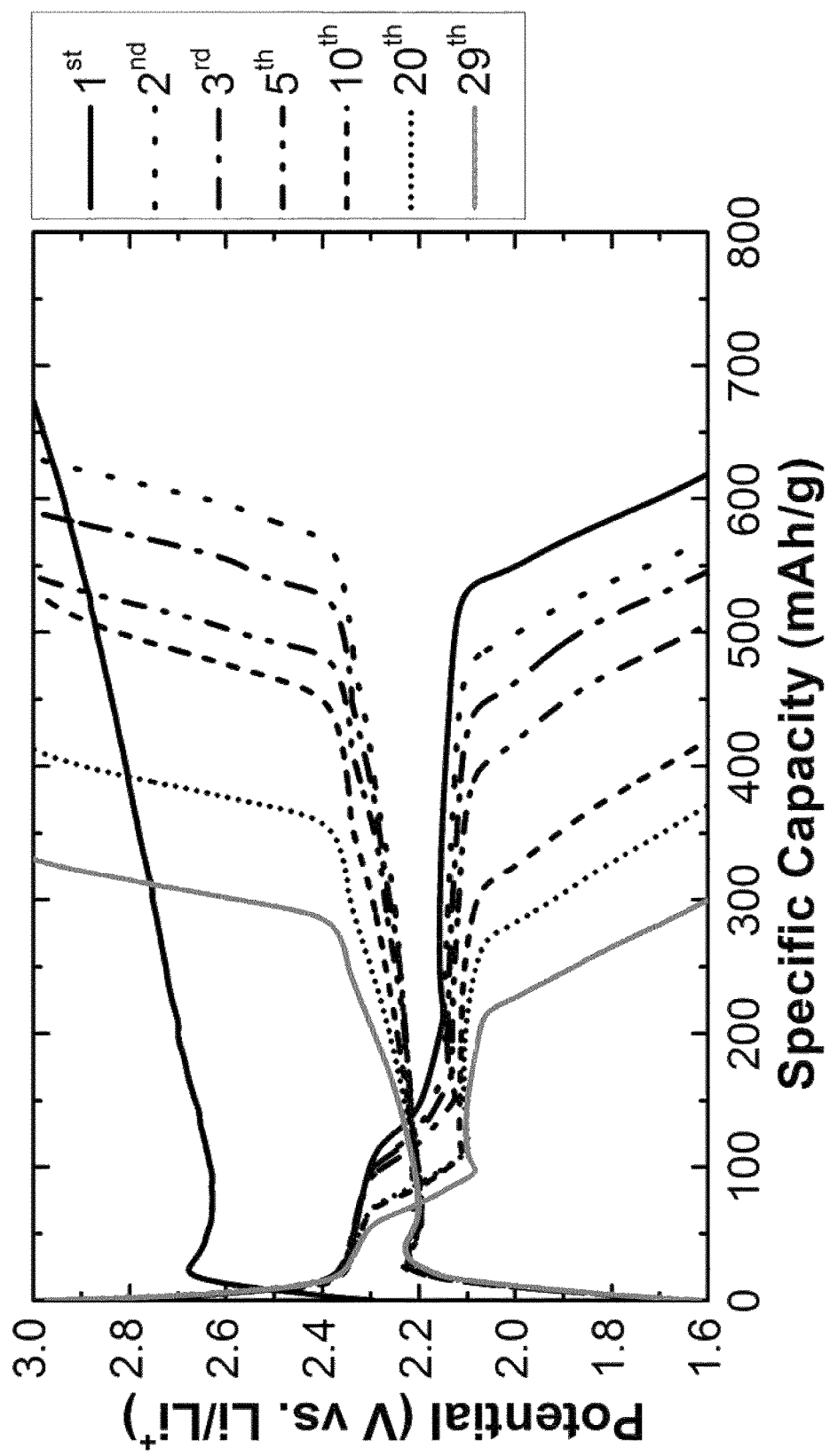
FIG. 15 depicts the charge-discharge profiles of a cathode having a loading of 70% by weight of an active material on an Al current collector under a current density of 100 mA/g and a voltage window of 1.6-3.0 V, where the active material is a 1:1 mixture of $Li_2S$ and NGNSs.
Figure 16:
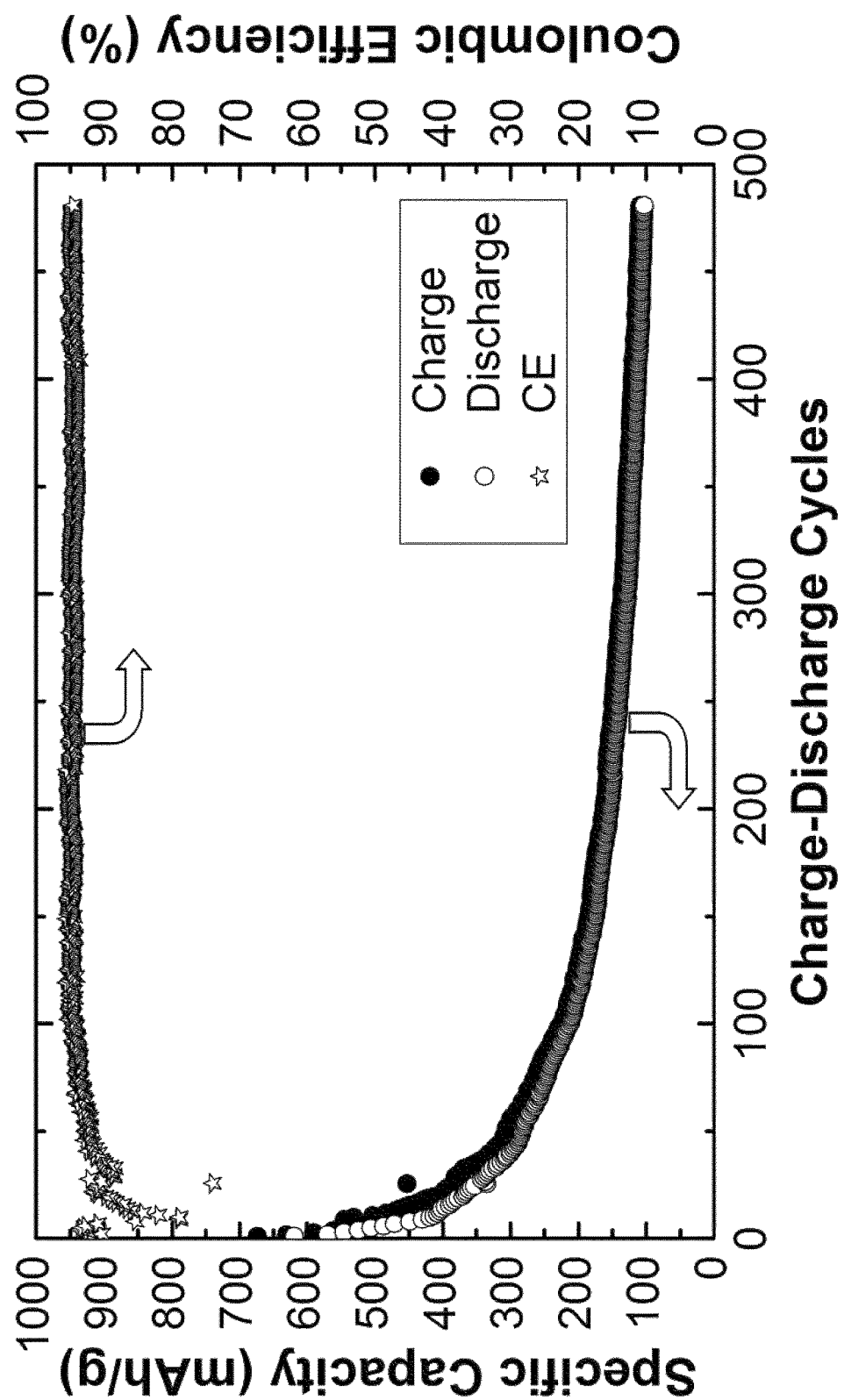
FIG. 16 depicts the cycling performance and Coulombic efficiency of the cathode of FIG. 15.

A cathode of the type disclosed by Example 5 was produced, except that the current collector was an aluminum foil. As shown in FIGS. 15 and 16, the capacity and Coulombic efficiency of the cathode after 100 cycles were significantly lower than the values observed for the cathode of Example 5.

Example 6

Figure 17:
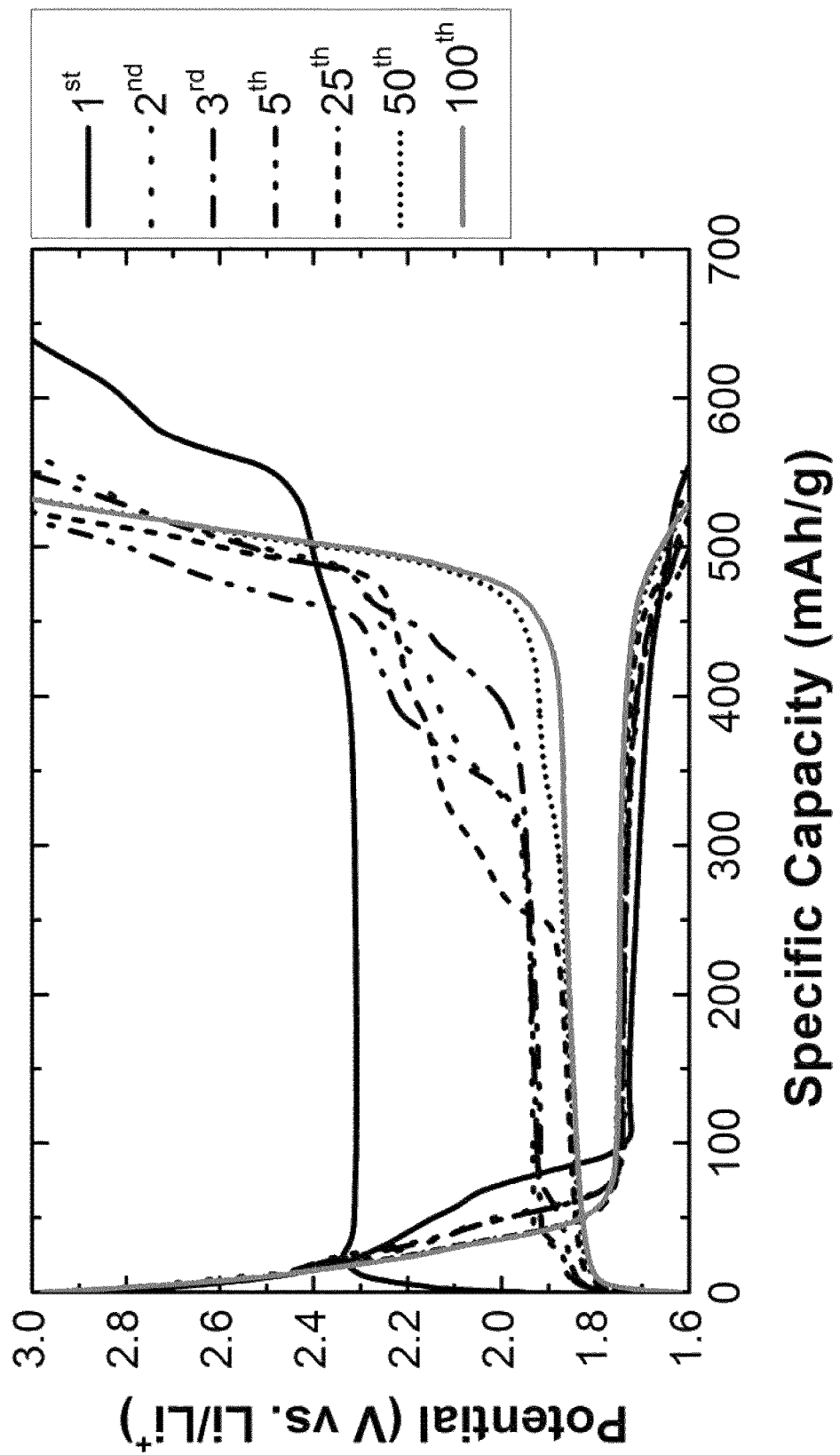
FIG. 17 depicts the charge-discharge profiles of a cathode having a loading of 70% by weight of an active material on a Cu current collector under a current density of 100 mA/g and a voltage window of 1.6-3.0 V, where the active material is a 5:2 mixture of $Li_2S$ and reduced graphene oxide nanosheets (rGNS).
Figure 18:
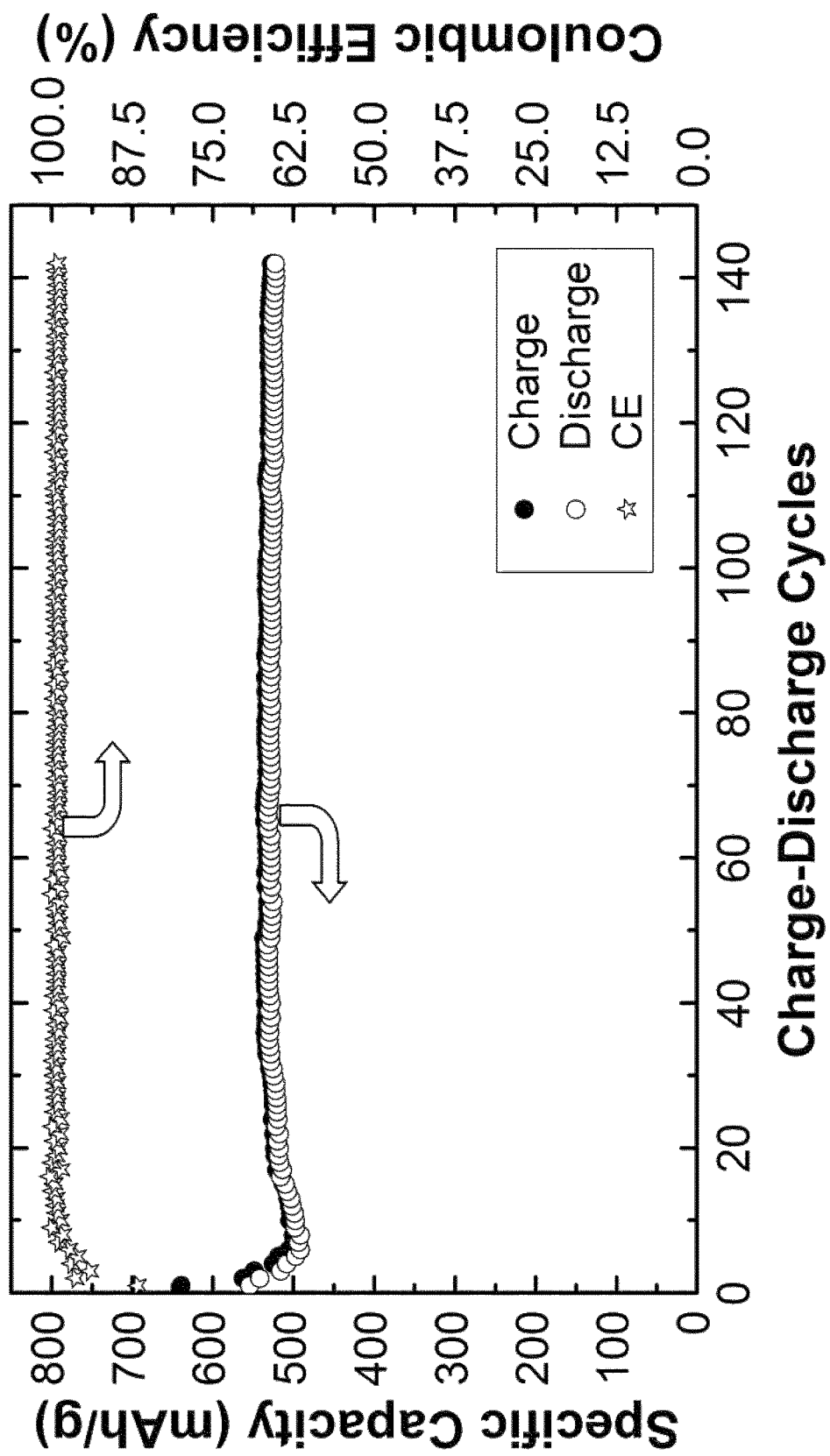
FIG. 18 depicts the cycling performance and Coulombic efficiency of the cathode of FIG. 17.

A cathode was prepared according to the method of Example 1, except that the active material was a 5:2 mixture of $Li_2S$ and rGNS. As shown in FIGS. 17 and 18, the cathode exhibited a capacity of 500-600 mAh/g after 100 cycles, a 100% Coulombic efficiency, and a capacity fade rate of 0.12% per cycle.

Comparative Example 3

Figure 19:
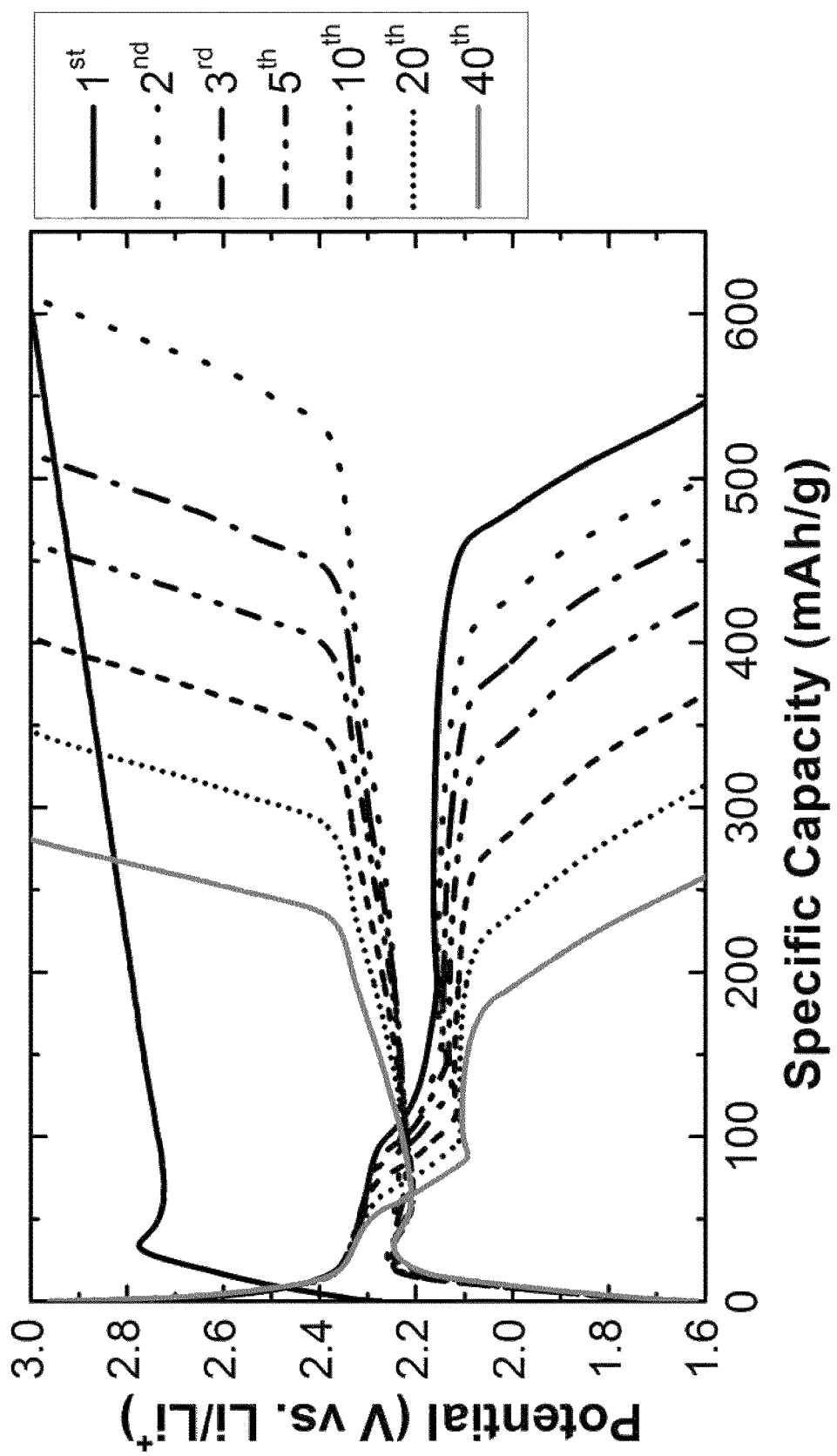
FIG. 19 depicts the charge-discharge profiles of a cathode having a loading of 70% by weight of an active material on an Al current collector under a current density of 100 mA/g and a voltage window of 1.6-3.0 V, where the active material is a 5:2 mixture of $Li_2S$ and rGNSs.
Figure 20:
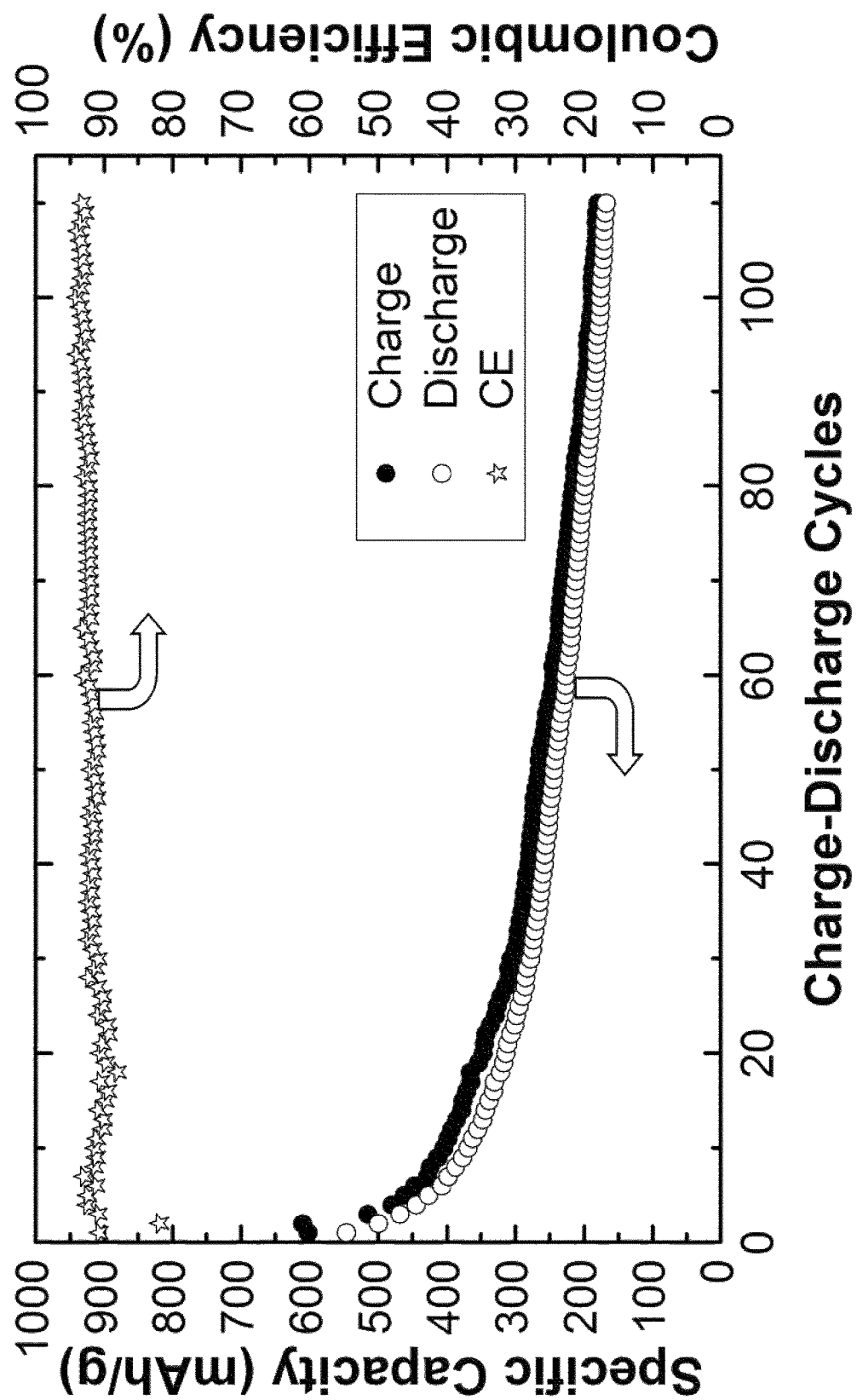
FIG. 20 depicts the cycling performance and Coulombic efficiency of the cathode of FIG. 19.

A cathode of the type disclosed by Example 6 was produced, except that the current collector was an aluminum foil. As shown in FIGS. 19 and 20, the capacity and Coulombic efficiency of the cathode after 100 cycles were significantly lower than the values observed for the cathode of Example 6.

Example 7

Figure 21:
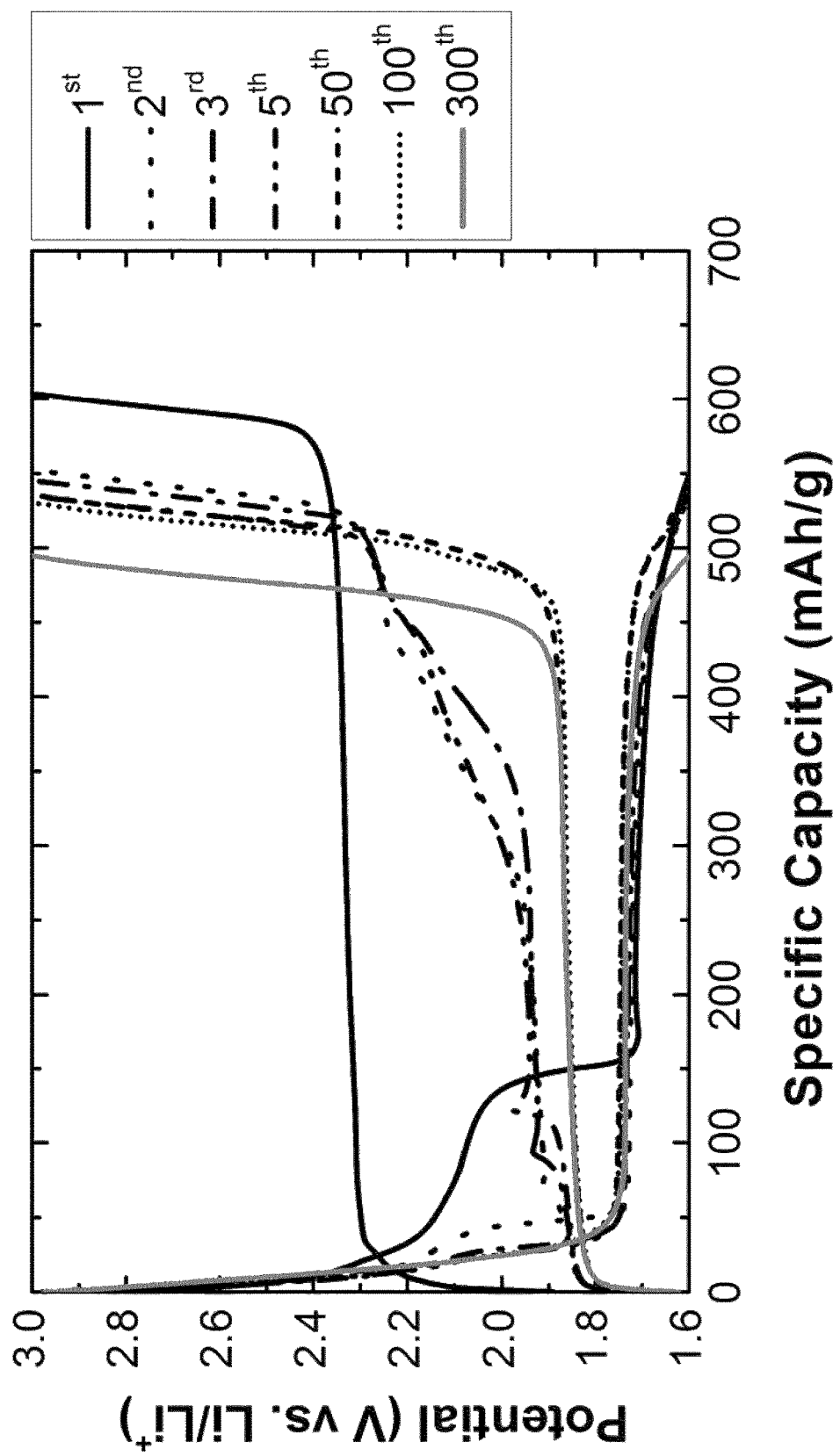
FIG. 21 depicts the charge-discharge profiles of a cathode having a loading of 70% by weight of an active material on a Cu current collector under a current density of 100 mA/g and a voltage window of 1.6-3.0 V, where the active material is a 5:2 mixture of $Li_2S$ and NGNSs.
Figure 22:
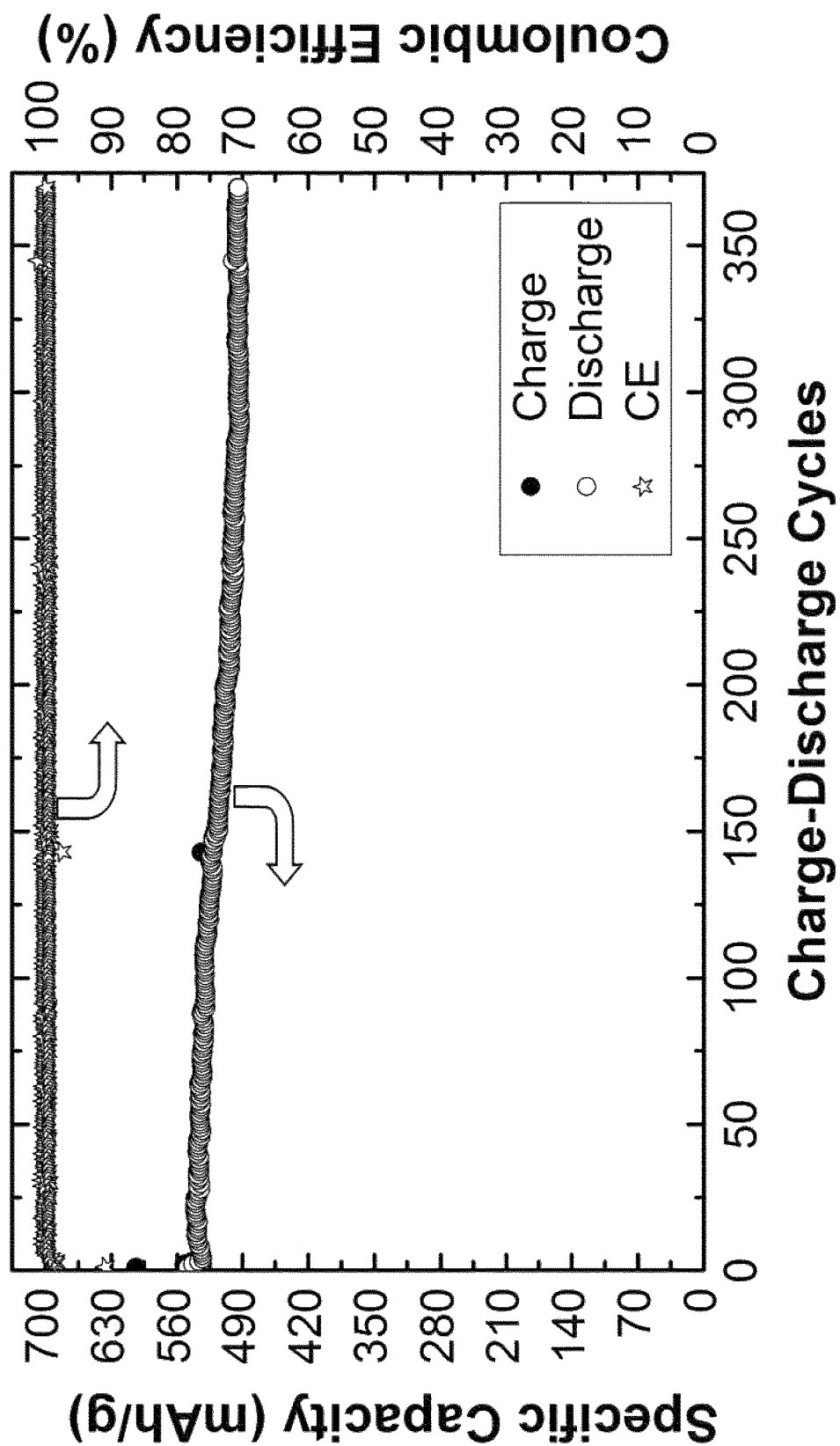
FIG. 22 depicts the cycling performance and Coulombic efficiency of the cathode of FIG. 21.

A cathode was prepared according to the method of Example 1, except that the active material was a 5:2 mixture of $Li_2S$ and NGNS. As shown in FIGS. 21 and 22, the cathode exhibited a capacity of 500-600 mAh/g after 100 cycles, a 100% Coulombic efficiency, and a capacity fade rate of 0.049% per cycle.

Comparative Example 4

Figure 23:
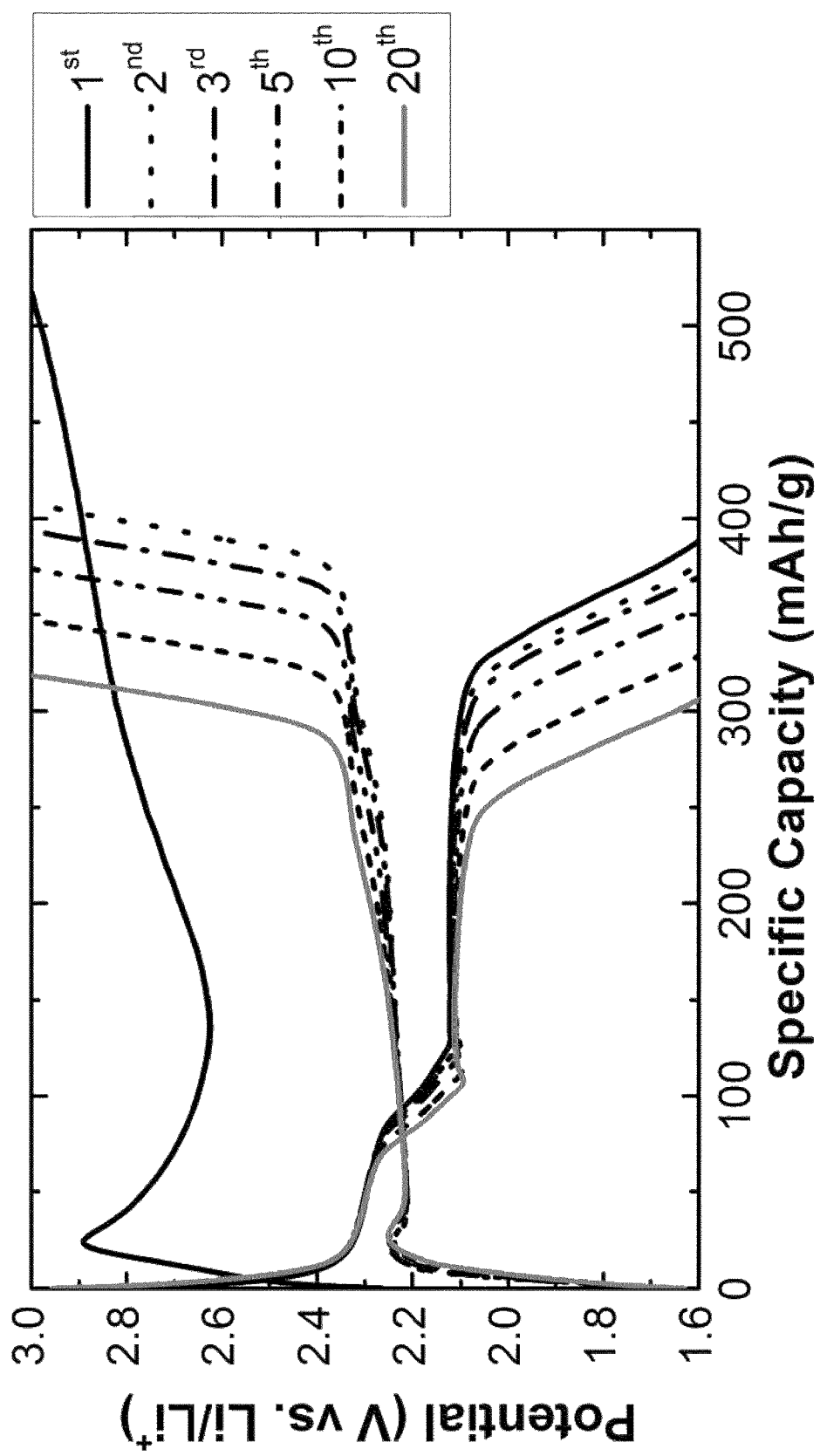
FIG. 23 depicts the charge-discharge profiles of a cathode having a loading of 70% by weight of an active material on an Al current collector under a current density of 100 mA/g and a voltage window of 1.6-3.0 V, where the active material is a 5:2 mixture of $Li_2S$ and NGNSs.
Figure 24:
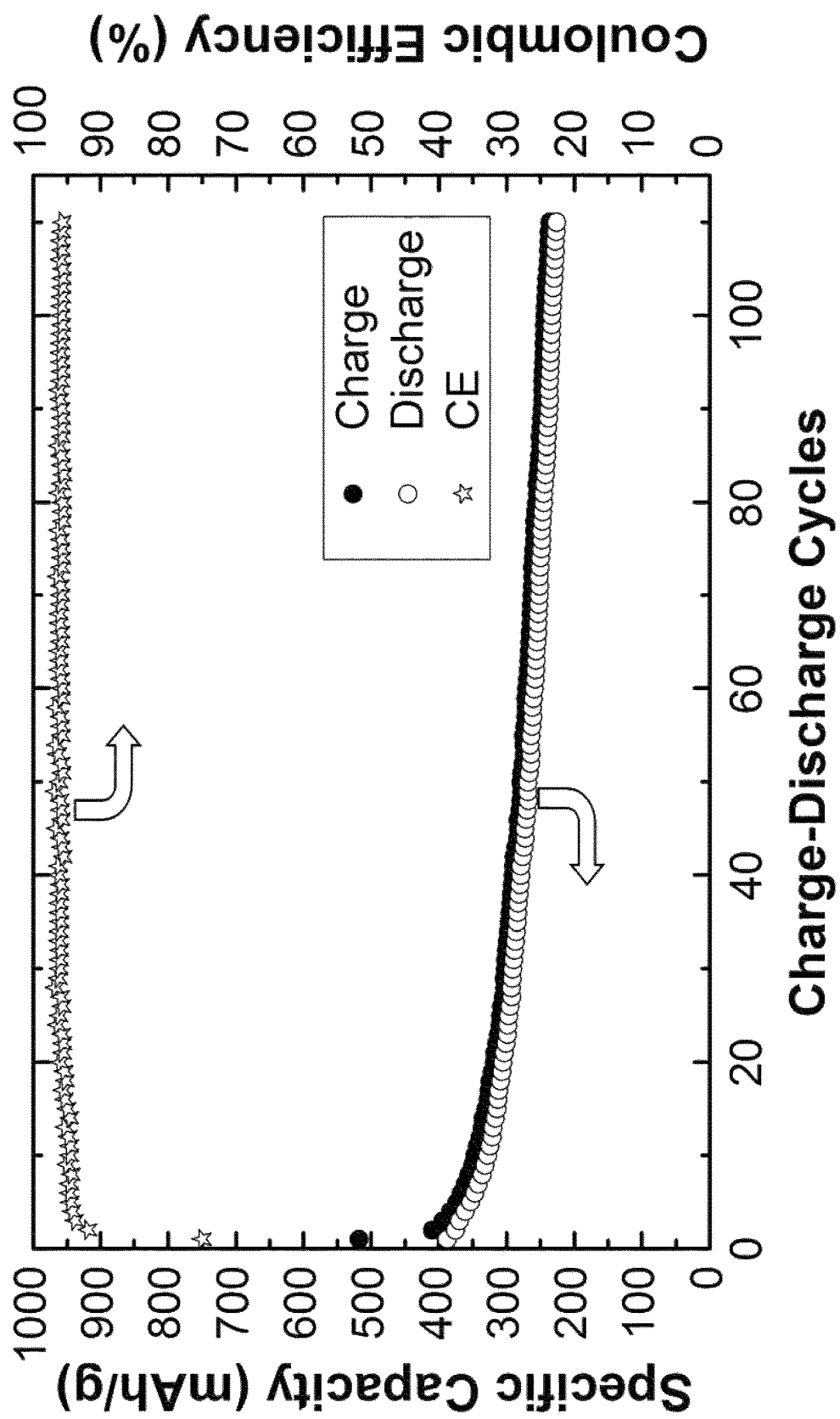
FIG. 24 depicts the cycling performance and Coulombic efficiency of the cathode of FIG. 23.

A cathode of the type disclosed by Example 7 was produced, except that the current collector was an aluminum foil. As shown in FIGS. 23 and 24, the capacity and Coulombic efficiency of the cathode after 100 cycles were significantly lower than the values observed for the cathode of Example 7.

Example 8

Figure 25:
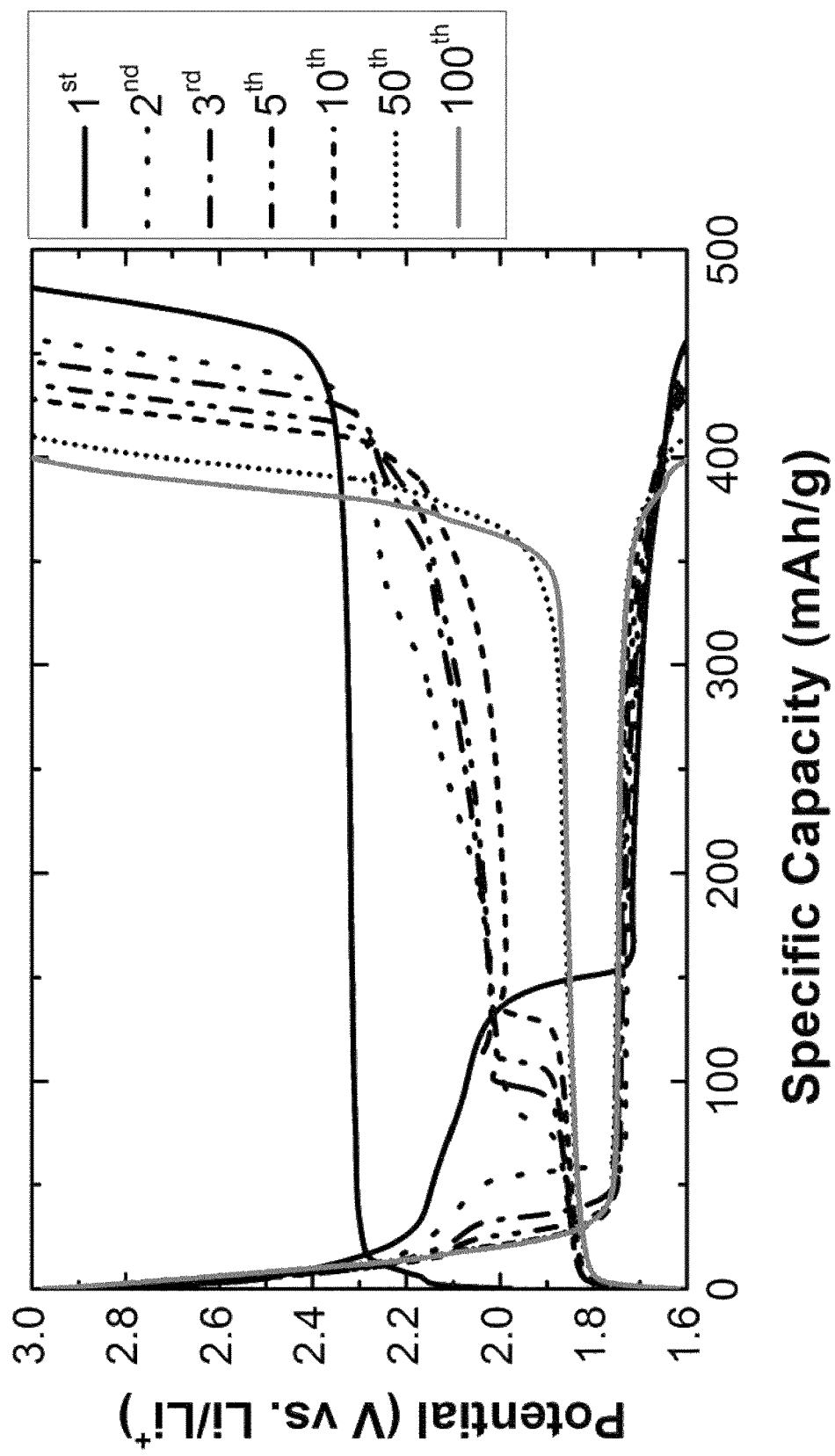
FIG. 25 depicts the charge-discharge profiles of a cathode having a loading of 70% by weight of an active material on a Cu current collector under a current density of 100 mA/g and a voltage window of 1.6-3.0 V, where the active material is a mixture of 52% $Li_2S$, 15% $Cu_2S$, and 33% NGNSs.
Figure 26:
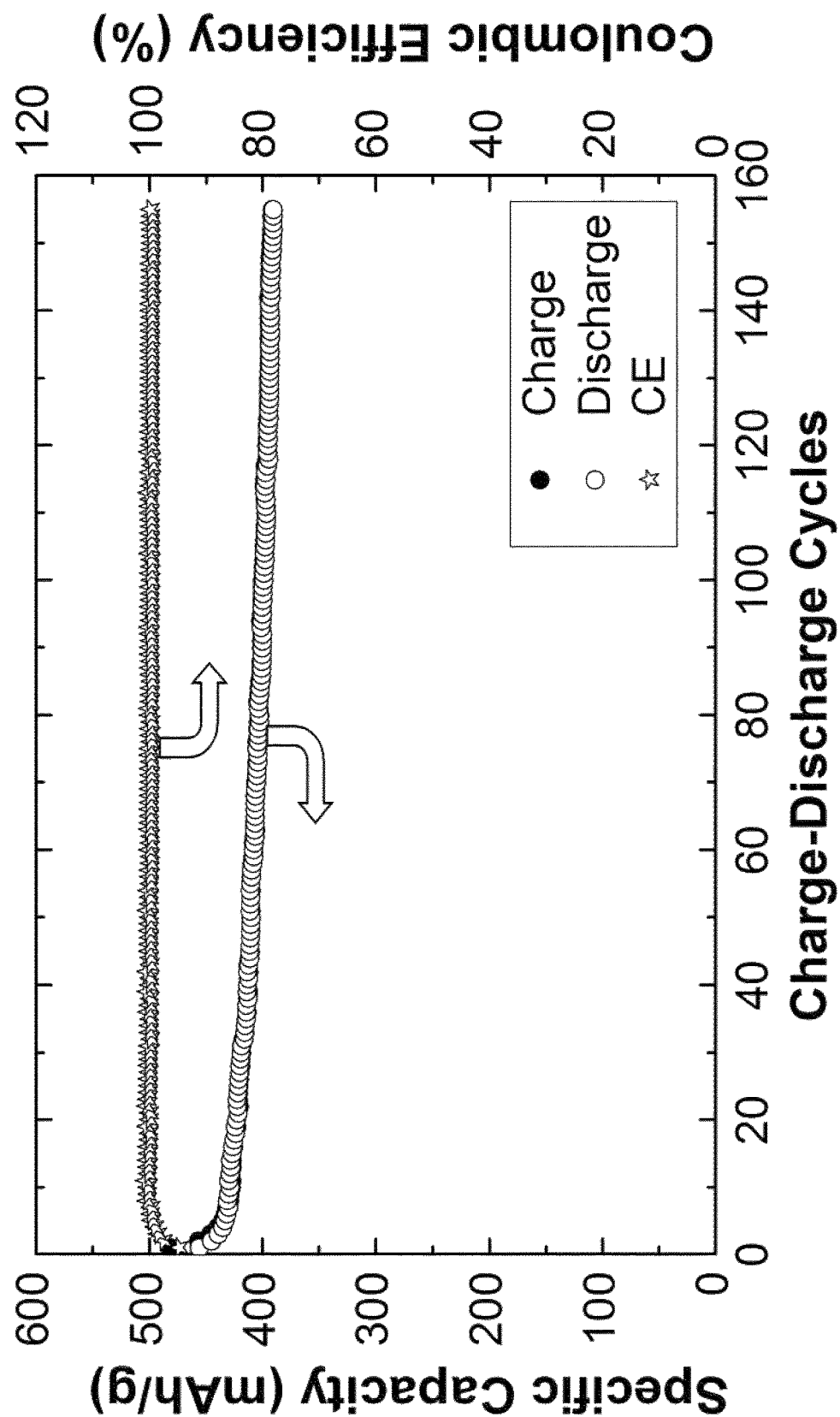
FIG. 26 depicts the cycling performance and Coulombic efficiency of the cathode of FIG. 25.

A cathode was prepared according to the method of Example 1, except that the active material was a mixture of 52% $Li_2S$, 15% $Cu_2S$ and 33% NGNS. As shown in FIGS. 25 and 26, the cathode exhibited a capacity of 400-500 mAh/g after 30 cycles and a 100% Coulombic efficiency.

Comparative Example 5

Figure 27:
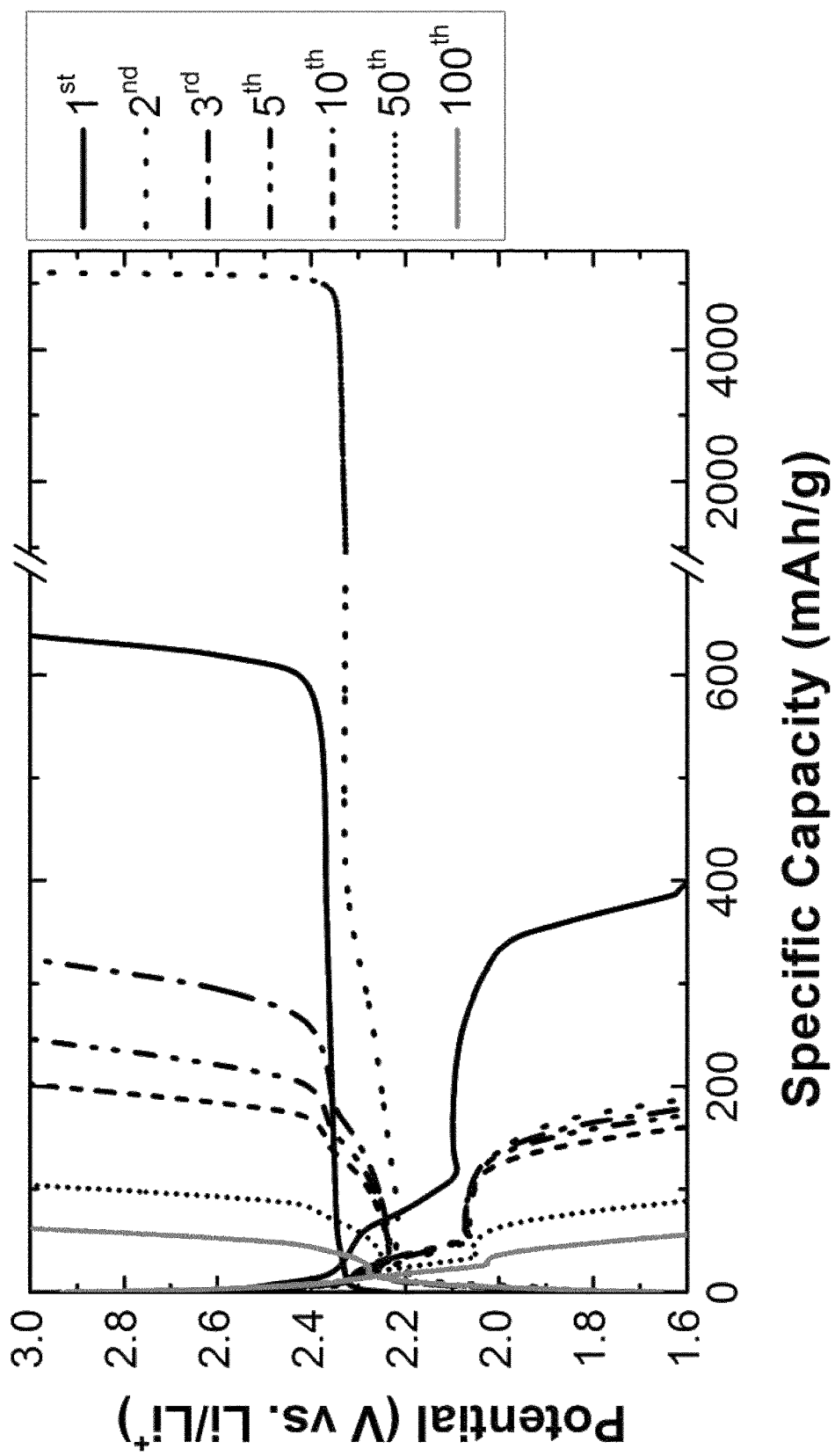
FIG. 27 depicts the charge-discharge profiles of a cathode having a loading of 70% by weight of an active material on an Al current collector under a current density of 100 mA/g and a voltage window of 1.6-3.0 V, where the active material is a mixture of 52% $Li_2S$, 15% $Cu_2S$, and 33% NGNSs.
Figure 28:
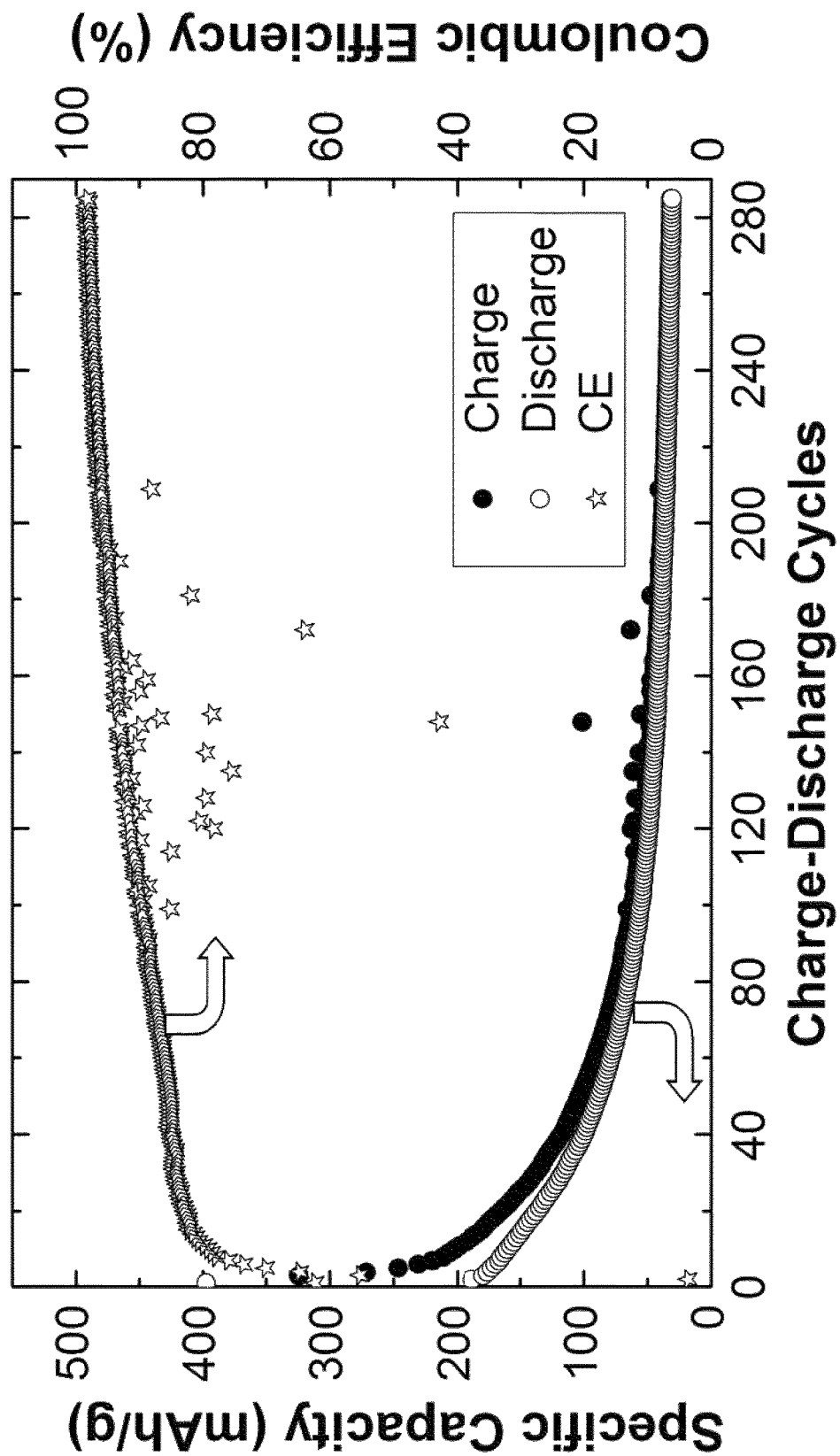
FIG. 28 depicts the cycling performance and Coulombic efficiency of the cathode of FIG. 27.

A cathode of the type disclosed by Example 8 was produced, except that the current collector was an aluminum foil. As shown in FIGS. 27 and 28, the capacity and Coulombic efficiency of the cathode after 30 cycles were significantly lower than the values observed for the cathode of Example 8.

Example 9

Figure 29:
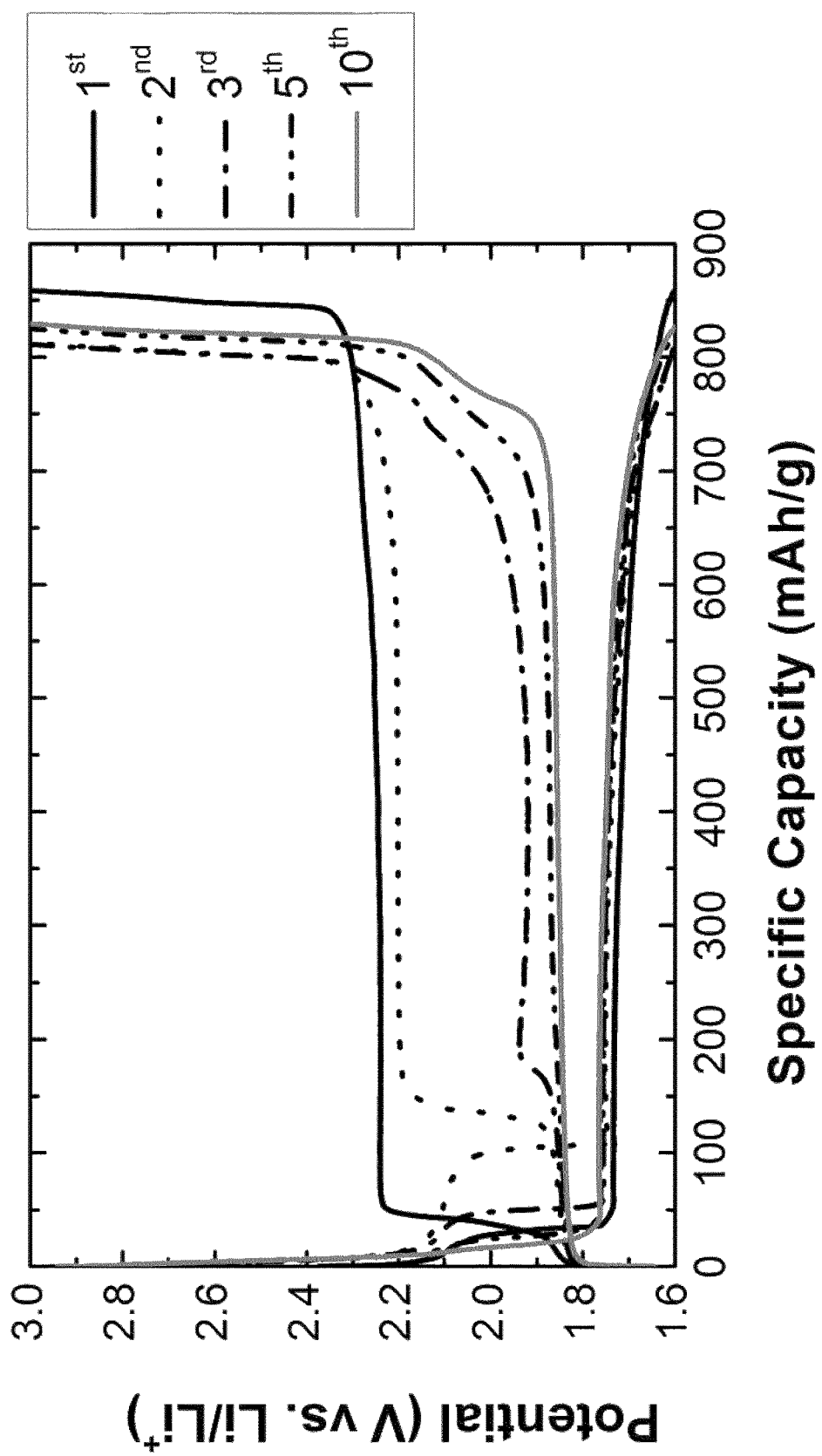
FIG. 29 depicts the charge-discharge profiles of a cathode having a loading of 70% by weight of an active material on a Cu current collector under a current density of 100 mA/g and a voltage window of 1.6-3.0 V, where the active material is a 1:1 mixture of S and $Cu_2S$.
Figure 30:
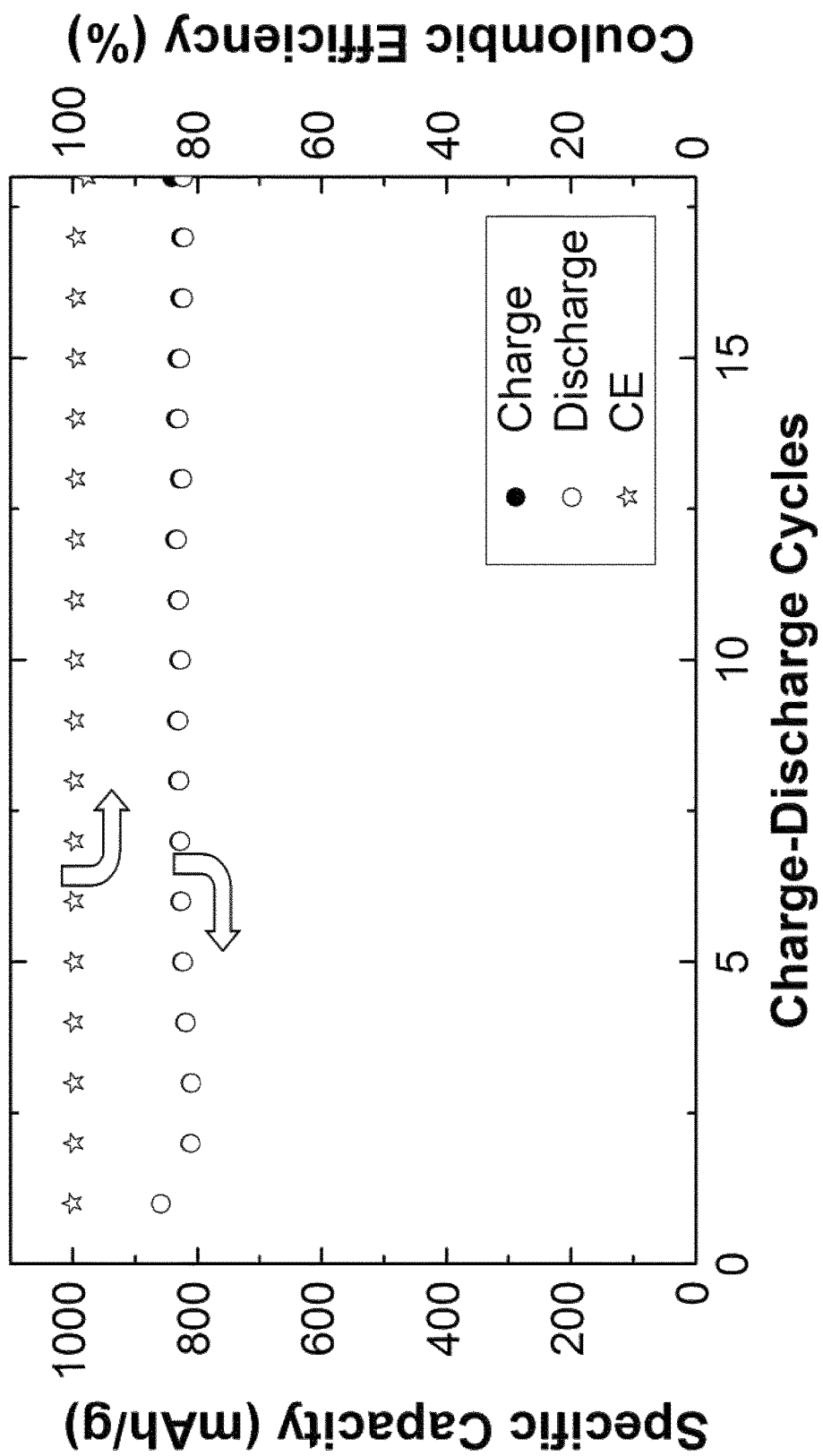
FIG. 30 depicts the cycling performance and Coulombic efficiency of the cathode of FIG. 29.

A cathode was prepared according to the method of Example 1, except that the active material was a 1:1 mixture of S and $Cu_2S$. As shown in FIGS. 29 and 30, the cathode exhibited a capacity of about 800 mAh/g after 15 cycles and a 100% Coulombic efficiency.

Comparative Example 6

Figure 31:
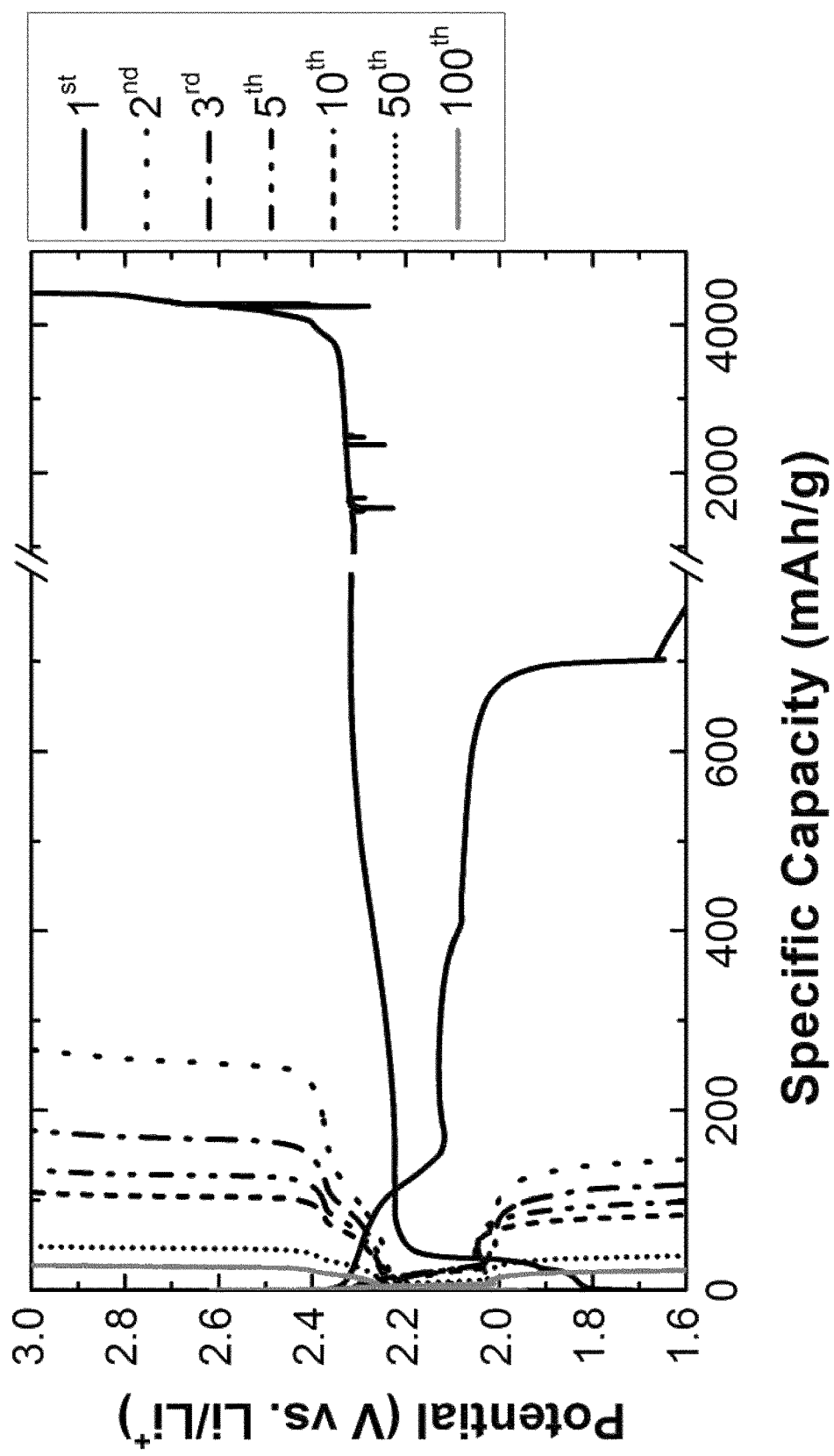
FIG. 31 depicts the charge-discharge profiles of a cathode having a loading of 70% by weight of an active material on an Al current collector under a current density of 100 mA/g and a voltage window of 1.6-3.0 V, where the active material is a 1:1 mixture of S and $Cu_2S$.
Figure 32:
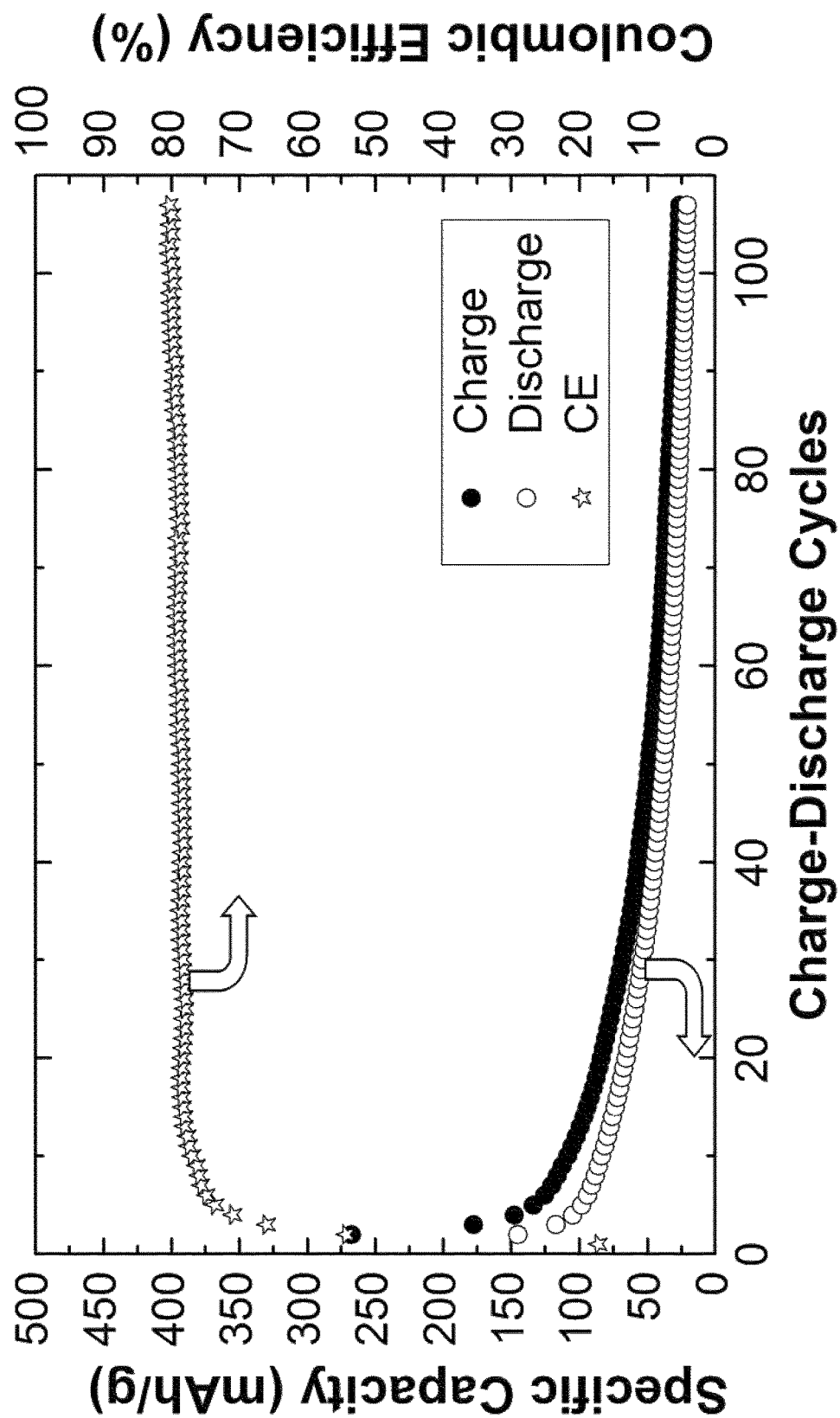
FIG. 32 depicts the cycling performance and Coulombic efficiency of the cathode of FIG. 31.

A cathode of the type disclosed by Example 9 was produced, except that the current collector was an aluminum foil. As shown in FIGS. 31 and 32, the capacity of the cathode after 15 cycles were significantly lower than the values observed for the cathode of Example 9.

ADDITIONAL NOTES

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." Any ranges cited herein are inclusive.

The terms "substantially" and "about" used throughout this Specification are used to describe and account for small fluctuations. For example, they may refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" may refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed is:

1. A cathode, comprising:
a current collector comprising copper; and
an active material layer comprising 70 wt % of an active material, a conductive material and a binder;

wherein the active material layer is disposed over the current collector, and the active material comprises 52 wt % $Li_2S$, 15 wt % $Cu_2S$ and 33 wt % nitrogen-doped graphene nanosheets.

2. The cathode of claim 1, wherein the current collector comprises a copper foil.

3. The cathode of claim 1, wherein the binder comprises polyvinylidene fluoride or polyethylene oxide.

4. The cathode of claim 1, wherein the conductive material comprises carbon black.

5. The cathode of claim 1, wherein the $Li_2S$ comprises microsized lithium sulfide.

6. The cathode of claim 1, wherein the active material layer has a thickness of 25 microns to 200 microns.

7. A lithium-sulfur battery comprising:
a cathode;
an anode; and
a lithium ion conducting electrolyte;
wherein the cathode comprises:
a current collector comprising copper; and
an active material layer comprising 70 wt % of an active material, a conductive material and a binder; wherein the active material layer is disposed over the current collector, and the active material comprises 52 wt % $Li_2S$, 15 wt % $Cu_2S$ and 33 wt % nitrogen-doped graphene nanosheets.

8. The lithium-sulfur battery of claim 7, wherein the anode does not include lithium.

9. A method of producing a cathode, comprising:
forming a slurry containing 70 wt % of active material, a conductive material, a binder and a solvent; and
disposing the slurry over a current collector;
wherein the active material comprises 52 wt % $Li_2S$, 15 wt % $Cu_2S$ and 33 wt % nitrogen-doped graphene nanosheets.

10. The method of claim 9, further comprising drying the slurry disposed over the current collector in a furnace.

* * * * *